United States Patent
Akahane et al.

(10) Patent No.: US 8,483,051 B2
(45) Date of Patent: Jul. 9, 2013

(54) NETWORK RELAY APPARATUS

(75) Inventors: Shinichi Akahane, Hachioji (JP); Yasuhiro Kodama, Yokohama (JP); Takao Nara, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 171 days.

(21) Appl. No.: 12/825,863

(22) Filed: Jun. 29, 2010

(65) Prior Publication Data
US 2011/0019679 A1 Jan. 27, 2011

(30) Foreign Application Priority Data

Jul. 23, 2009 (JP) .................................. 2009-172282

(51) Int. Cl.
*G01R 31/08* (2006.01)
(52) U.S. Cl.
USPC ............................. 370/222; 370/401; 370/403
(58) Field of Classification Search
None
See application file for complete search history.

(56) References Cited

U.S. PATENT DOCUMENTS

| 7,590,114 | B1 * | 9/2009 | Bishara ........................ 370/390 |
| 7,974,223 | B2 * | 7/2011 | Zelig et al. ................... 370/258 |
| 8,111,634 | B2 * | 2/2012 | Florit et al. ................... 370/258 |
| 2008/0069100 | A1 * | 3/2008 | Weyman et al. ............... 370/390 |
| 2010/0238813 | A1 * | 9/2010 | Allan et al. ................... 370/252 |

FOREIGN PATENT DOCUMENTS

JP 2004-201009 7/2004

* cited by examiner

*Primary Examiner* — Dang Ton
*Assistant Examiner* — Ronald H Davis
(74) *Attorney, Agent, or Firm* — Antonelli, Terry, Stout & Kraus, LLP.

(57) ABSTRACT

The network relay apparatus is provided. The network relay apparatus includes: multiple ports, each being provided to send and receive a frame to and from one of multiple external devices; and a frame processor configured to perform flooding, in order to relay a received frame that is received via one of the multiple ports as a receiving port, with a preset flooding target according to an attribute of a transmit port that sends the received frame.

5 Claims, 31 Drawing Sheets

Fig.2A
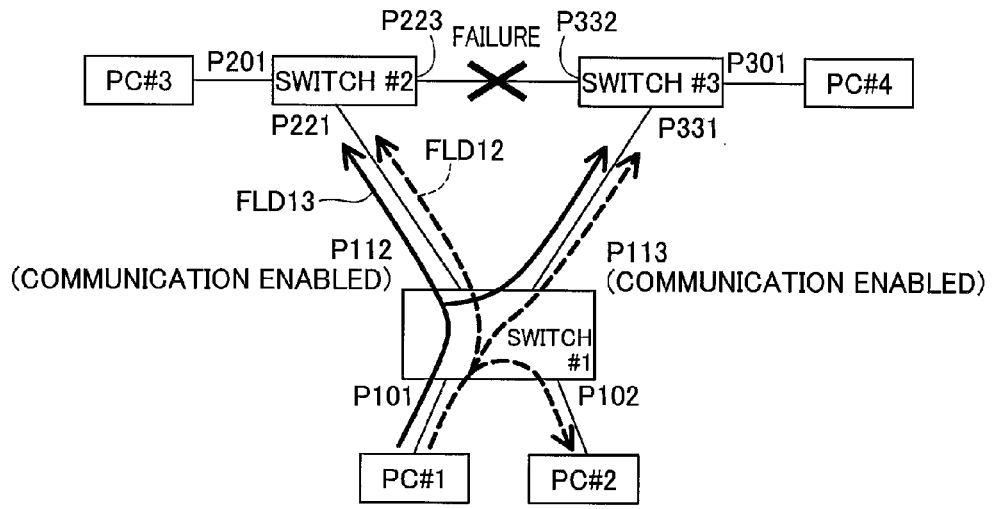
Fig.2B
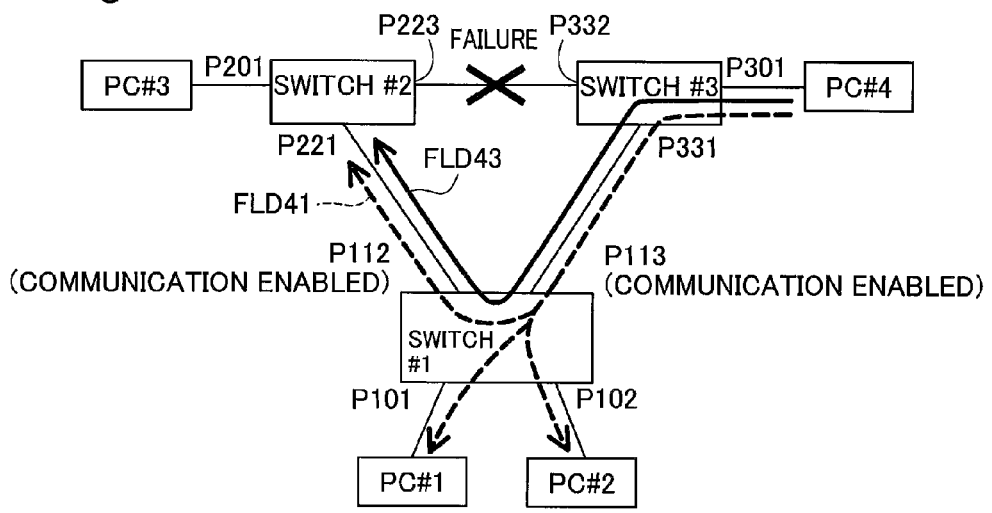
Fig.3
| | TRANSMIT PORT | |
|---|---|---|
| | RING | NON-RING |
| FLOODING TARGET | RING PORT | RING PORT NON-RING PORT |

| RECEIVING PORT NUMBER :RPN | PORT ATTRIBUTE :RPT |
|---|---|
| P101 | NRP |
| P102 | NRP |
| P112 | RP |
| P113 | RP |
| ⋮ | ⋮ |

SEARCH KEY / SEARCH RESULT

| RECEIVING PORT NUMBER :VNP | VLAN NUMBER :VNO | TYPE :VTY | INTRA-DEVICE VLAN NUMBER :VSN |
|---|---|---|---|
| * | VID1 | * | V101 |
| * | VID2 | * | V102 |
| P101 | * | * | V103 |
| ⋮ | ⋮ | ⋮ | ⋮ |

SEARCH KEYS / SEARCH RESULT

| PORT NUMBER :FNPT | PLANE NUMBER :FNNO |
|---|---|
| P101 | 0 |
| P102 | 0 |
| P112 | 1 |
| P113 | 1 |
| ⋮ | ⋮ |

SEARCH KEY / SEARCH RESULT

Fig.10

| INTRA-DEVICE VLAN NUMBER :MSN | MAC ADDRESS :MMA | PLANE NUMBER :MFO | PORT NUMBER :MPT | PORT ATTRIBUTE :MTY | HIT BIT :MHB |
|---|---|---|---|---|---|
| V103 | M1 | 0 | P101 | NRP | 1 |
| V101 | M2 | 0 | P102 | NRP | 1 |
| V101 | M3 | 0 | P112 | RP | 1 |
| V101 | M4 | 0 | P113 | RP | 1 |
| ⋮ | ⋮ | ⋮ | ⋮ | ⋮ | ⋮ |

| | PLANE NUMBER :FFO | PORT NUMBER :FPT | FLOODING INDICATION :FIN |
|---|---|---|---|
| EG1 | 0 | P101 | − |
| | 0 | P102 | − |
| | 0 | P112 | FLD |
| | 0 | P113 | FLD |
| | ⋮ | ⋮ | ⋮ |
| EG2 | 1 | P101 | FLD |
| | 1 | P102 | FLD |
| | 1 | P112 | − |
| | 1 | P113 | − |
| | ⋮ | ⋮ | ⋮ |
| EG3 | 2 | P101 | FLD |
| | ⋮ | ⋮ | ⋮ |

580

SEARCH KEYS — SEARCH RESULT

Fig.12

|  | PORT ATTRIBUTE :FAPT | INTRA-DEVICE VLAN NUMBER :FASN | TRANSMIT PORT NUMBER :FAPN |
|---|---|---|---|
| NF | NRP | V101 | P101,P102,P112,P113 |
|  | NRP | V102 | P101,P102,P112 |
|  | ⋮ | ⋮ | ⋮ |
| RF | RP | V101 | P112,P113 |
|  | RP | V102 | P112 |
|  | ⋮ | ⋮ | ⋮ |

SEARCH KEYS — SEARCH RESULT

| INTRA-DEVICE VLAN NUMBER :FDSN | PORT NUMBER :FDPN | MAC ADDRESS :FDMA | CONTROL FRAME TYPE :FDFT | FRAME PROCESSING TYPE :FDPO | NOTIFICATION CONDITION :FDI | TIMEOUT PERIOD :FDTT | NO-RECEIVING PERIOD :FDNT | NOTIFICATION STATE :FDCD |
|---|---|---|---|---|---|---|---|---|
| V101 | * | M1 | HC | DISCARD | TIMEOUT | 10ms | 5ms | NOT NOTIFIED |
| V101 | * | M2 | FF | DISCARD | ON RECEPTION | – | – | NOT NOTIFIED |
| ... | ... | ... | ... | ... | ... | ... | ... | ... |
| VXXX | * | MXX | FF | FORWARD | ON RECEPTION | – | – | NOT NOTIFIED |

SEARCH KEYS — SEARCH RESULTS

| PORT NUMBER :FMPT | ACTIVE PLANE NUMBER :FMNO |
|---|---|
| P101 | 0 |
| P102 | 0 |
| P112 | 1 |
| P113 | 1 |
| ⋮ | ⋮ |

SEARCH KEY / SEARCH RESULT

Fig.25

| INTRA-DEVICE VLAN NUMBER :FNSN | PLANE NUMBER :FNNO | 560a |
|---|---|---|
| V101 | 0 | |
| V102 | 0 | |
| V103 | 0 | |
| ⋮ | ⋮ | |

SEARCH KEY — SEARCH RESULT

Fig.26

| PLANE NUMBER :FFO | INTRA-DEVICE VLAN NUMBER :FSN | FLOODING INDICATION :FIN |
|---|---|---|
| 0 | V101 | – |
| 0 | V102 | – |
| 0 | V103 | – |
| ⋮ | ⋮ | ⋮ |
| 1 | V101 | FLD |
| 1 | V102 | FLD |
| 1 | V103 | FLD |
| ⋮ | ⋮ | ⋮ |
| 2 | V101 | FLD |
| 2 | V102 | FLD |
| 2 | V103 | FLD |
| ⋮ | ⋮ | ⋮ |

580a

SEARCH KEYS — SEARCH RESULT

Fig.27

| INTRA-DEVICE VLAN NUMBER :FMSN | ACTIVE PLANE NUMBER :FMNO |
|---|---|
| V101 | 0 |
| V102 | 0 |
| V103 | 0 |
| ⋮ | ⋮ |

SEARCH KEY  SEARCH RESULT

Fig.29

| PORT NUMBER :FNPT | INTRA-DEVICE VLAN NUMBER :FNSN | PLANE NUMBER :FNNO |
|---|---|---|
| P101 | V103 | 0 |
| P102 | V101 | 0 |
| P112 | V101 | 0 |
| ⋮ | ⋮ | ⋮ |

560b

SEARCH KEYS / SEARCH RESULT

Fig.30

| PLANE NUMBER :FFO | PORT NUMBER :FPT | INTRA-DEVICE VLAN NUMBER :FSN | FLOODING INDICATION :FIN |
|---|---|---|---|
| 0 | P101 | V103 | – |
| 0 | P102 | V101 | – |
| 0 | P112 | V101 | – |
| ⋮ | ⋮ | ⋮ | ⋮ |
| 1 | P101 | V103 | FLD |
| 1 | P102 | V101 | FLD |
| 1 | P112 | V101 | FLD |
| ⋮ | ⋮ | ⋮ | ⋮ |
| 2 | P101 | V103 | FLD |
| 2 | P102 | V101 | FLD |
| 2 | P112 | V101 | FLD |
| ⋮ | ⋮ | ⋮ | ⋮ |

580b

SEARCH KEYS / SEARCH RESULT

Fig.31

| PORT NUMBER :FMPT | INTRA-DEVICE VLAN NUMBER :FMSN | ACTIVE PLANE NUMBER :FMNO |
|---|---|---|
| P101 | V103 | 0 |
| P102 | V101 | 0 |
| P112 | V101 | 0 |
| ⋮ | ⋮ | ⋮ |

SEARCH KEYS — SEARCH RESULT

Fig.33

| INTRA-DEVICE VLAN NUMBER :MSN | MAC ADDRESS :MMA | PLANE NUMBER :MFO | PORT NUMBER :MPT | HIT BIT :MHB |
|---|---|---|---|---|
| V103 | M1 | 0 | P101 | 1 |
| V101 | M2 | 0 | P102 | 1 |
| V101 | M3 | 0 | P112 | 1 |
| V101 | M4 | 0 | P113 | 1 |
| ⋮ | ⋮ | ⋮ | ⋮ | ⋮ |

| TRANSMIT PORT NUMBER :RPO | PORT ATTRIBUTE :RPT |
|---|---|
| P101 | NRP |
| P102 | NRP |
| P112 | RP |
| P113 | RP |
| ⋮ | ⋮ |

910

SEARCH KEY    SEARCH RESULT

NETWORK RELAY APPARATUS

CROSS-REFERENCE TO RELATED APPLICATIONS

The present application claims priority to Japanese Patent Application No. 2009-172282 filed on Jul. 23, 2009, the disclosure of which is hereby incorporated by reference in its entirety.

BACKGROUND OF THE INVENTION

1. Field of the Invention

The present invention relates to a network relay apparatus used for relay in a network.

2. Description of the Related Art

With a view to assuring the redundancy of a layer 2 network, network relay apparatuses for relaying frames are connected to form a ring network. A redundant protocol used in such a ring network configuration of the network relay apparatuses is called a ring protocol. In the occurrence of some failure on a route in the network, the network relay apparatus receiving a frame performs a flooding operation to relay the received frame in the ring protocol.

The conventional network relay apparatus performs flooding with setting all the ports other than the frame-receiving port as the flooding target. Frames sent by the flooding operation may apply the heavy load on the frequency band of the communication line. Frames are sent to even devices that do not require the frames by the flooding operation. This is undesirable from the security viewpoint.

These phenomena are not characteristic of the ring protocol but are observed in other protocols used in different network configurations.

SUMMARY

By taking into account the issue discussed above, there is a requirement for providing a network relay apparatus that enhances the security, while reducing the load of flooding on a frequency band.

According to first aspect of the present invention, a network relay apparatus is provided. The network relay apparatus includes: multiple ports, each being provided to send and receive a frame to and from one of multiple external devices; and a frame processor configured to perform flooding, in order to relay a received frame that is received via one of the multiple ports as a receiving port, with a preset flooding target according to an attribute of a transmit port that sends the received frame.

In the network relay apparatus according to this aspect of the invention, the frame processor performs flooding with the preset flooding target according to the attribute of the transmit port sending the received frame. This arrangement desirably reduces the load of unnecessary flooding on the frequency band, while enhancing the security.

According to the first aspect of the present invention, the network relay apparatus may further includes: a port attribute storage configured to store a port attribute in correlation with each of the multiple ports; and a flooding target storage configured to store a flooding target set in advance with regard to each port attribute, wherein the frame processor refers to information registered in the port attribute storage and in the flooding target storage to set a flooding target corresponding to the attribute of the transmit port and performs flooding.

In the network relay apparatus of this application, the frame processor is allowed to perform flooding with the preset flooding target according to the attribute of the transmit port sending the received frame. This arrangement desirably reduces the load of unnecessary flooding on the frequency band, while enhancing the security.

According to the first aspect of the present invention, the network relay apparatus may further includes: a MAC address storage configured to store a MAC address of each of the multiple external devices in correlation with one of the multiple ports; a learning manager configured to retrieve an attribute of the receiving port from the port attribute storage and register the retrieved attribute in correlation with a corresponding port in the MAC address storage, so as to implement a learning process with regard to the MAC address storage; and a flooding indication storage configured to store requirement or non-requirement of flooding in correlation with each of the multiple ports, wherein the frame processor performs a destination search of the MAC address storage to specify the transmit port and the attribute of the transmit port, and the frame processor retrieves requirement or non-requirement of flooding from the flooding indication storage based on the specified transmit port, and on retrieval of the requirement of flooding, and sets a flooding destination from retrieval of the flooding target storage based on the specified attribute of the transmit port and performs flooding.

In the network relay apparatus of this application, the learning manager registers the attribute of a port specified as a learning object into the MAC address storage in the learning process of the MAC address storage. Such registration enables the frame processor to obtain both the information on the transmit port sending the received frame and on the attribute of the transmit port as a result of the destination search of the MAC address storage. This results in increasing the speed of frame forwarding process in the network relay apparatus.

According to the first aspect of the present invention, the network relay apparatus may further includes: a MAC address storage configured to store a MAC address of each of the multiple external devices in correlation with one of the multiple ports; a flooding indication storage configured to store requirement or non-requirement of flooding in correlation with each of the multiple ports, wherein the frame processor performs a destination search of the MAC address storage to specify the transmit port, and searches the port attribute storage with the specified transmit port as a key to specify the attribute of the transmit port, and the frame processor retrieves requirement or non-requirement of flooding from the flooding indication storage based on the specified transmit port, and on retrieval of the requirement of flooding, and sets a flooding destination from retrieval of the flooding target storage based on the specified attribute of the transmit port and performs flooding.

In the network relay apparatus of this application, the frame processor performs a destination search of the MAC address storage to specify the transmit port sending the received frame, and searches the port attribute storage with the specified transmit port as a key to specify the attribute of the transmit port. In the network relay apparatus of this application, the attributes of the respective ports are registered in the port attribute storage. This arrangement facilitates the structural change of the network relay apparatus.

According to the first aspect of the present invention, the network relay apparatus may further includes: a table manager configured to update information registered in the MAC address storage, wherein when an attribute of each of the multiple ports directly or indirectly registered in the MAC address storage coincides with a specified attribute, the table manager does not delete information of correlating a MAC address of one of the multiple external devices to one of the multiple ports from the MAC address storage, even on reception of a deletion request from the MAC address storage.

In the network relay apparatus of this application, when the attribute of a port registered directly or indirectly in the MAC address storage coincides with a specified attribute, the table manager does not delete information from the MAC address storage. Non-deletion of information from the MAC address storage enables the frame processor to perform a destination search of the MAC address storage and specify the transmit port sending the received frame. The frame processor is allowed to perform flooding with the preset flooding target according to the attribute of the transmit port sending the received frame. This arrangement desirably reduces the load of unnecessary flooding on the frequency band, while enhancing the security.

According to the first aspect of the present invention, the network relay apparatus may further includes: a device manager configured to receive a deletion request from one of the multiple external devices connecting with the network relay apparatus and delete corresponding information of correlating a MAC address of one of the multiple external devices to one of the multiple ports from the MAC address storage.

The network relay apparatus of this application receives a deletion request from one of the external devices and deletes corresponding information from the MAC address storage. This arrangement enables the remaining non-required information to be deleted at any arbitrary timing, thus assuring the flexible network operation.

According to the first aspect of the present invention, the network relay apparatus may further includes: the learning manager allocates an identification code of a different virtual network to each attribute of the receiving port and registers the allocated identification code of each virtual network in correlation with a corresponding port in the MAC address storage.

The technique of the invention is not restricted to the network relay apparatus having any of the configurations discussed above, but may be actualized by diversity of other applications, for example, a control method of such a network relay apparatus, a network relay system, computer programs executed to implement the functions of the apparatus or the system or the functional steps of the method, and recording media in which such computer programs are recorded.

BRIEF DESCRIPTION OF THE DRAWINGS

FIGS. 2A and 2B are explanatory diagrammatic representations of flooding operations performed by the switch #1 after the occurrence of a failure;

FIG. 3 is an explanatory diagrammatic representation of a relation between the flooding target and the transmit port;

FIG. 7 is an explanatory diagrammatic representation of one example of the ring port identification table;

FIG. 8 is an explanatory diagrammatic representation of one example of the VLAN specification table;

FIG. 9 is an explanatory diagrammatic representation of one example of the plane number table;

FIG. 10 is an explanatory diagrammatic representation of one example of the MAC address table;

FIG. 11 is an explanatory diagrammatic representation of one example of the flooding indication table;

FIG. 12 is an explanatory diagrammatic representation of one example of the flooding target table;

FIG. 16 is an explanatory diagrammatic representation of one example of the ring protocol control frame identification table;

FIG. 20 is an explanatory diagrammatic representation of one example of the plane number management table;

FIG. 25 is an explanatory diagrammatic representation of one example of the plane number table in the second embodiment;

FIG. 26 is an explanatory diagrammatic representation of one example of the flooding indication table in the second embodiment;

FIG. 27 is an explanatory diagrammatic representation of one example of the plane number management table in the second embodiment;

FIG. 29 is an explanatory diagrammatic representation of one example of the plane number table in the third embodiment;

FIG. 30 is an explanatory diagrammatic representation of one example of the flooding indication table in the third embodiment;

FIG. 31 is an explanatory diagrammatic representation of one example of the plane number management table in the third embodiment;

FIG. 33 is an explanatory diagrammatic representation of one example of the MAC address table in the fourth embodiment;

FIG. 34 is an explanatory diagrammatic representation of one example of the output port identification table in the fourth embodiment;

DESCRIPTION OF THE PREFERRED EMBODIMENT

Figure 1:
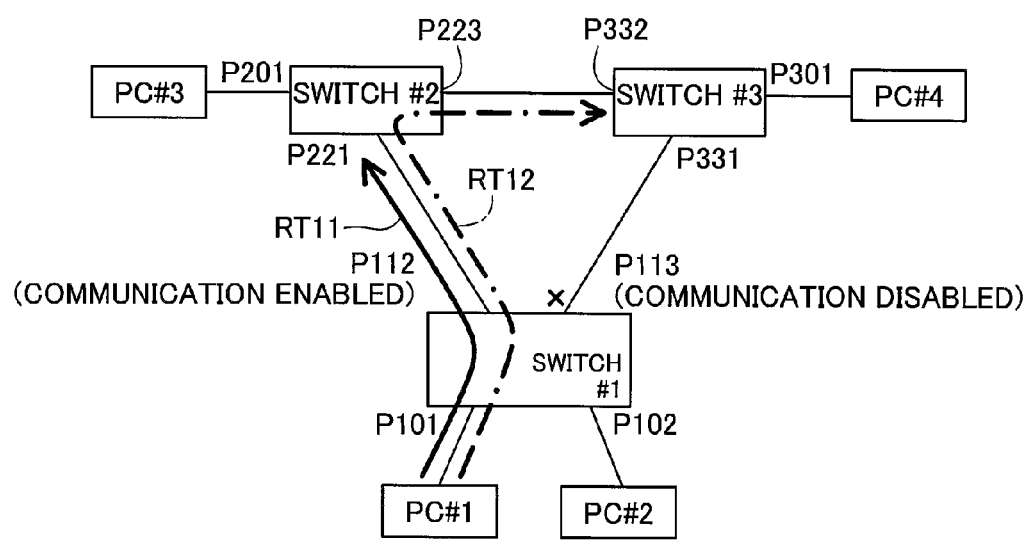
FIG. 1 is an explanatory diagrammatic representation of a general network configuration including network relay devices according to one embodiment of the invention.

Next, aspects of the present invention will be described in the following order on the basis of embodiments:
A. First Embodiment
(A-1) General Concept FIG. 1 is an explanatory diagrammatic representation of a general network configuration including network relay devices according to one embodiment of the invention. The network relay device of this embodiment is equivalent to the network relay apparatus of the invention. The network configuration includes three network relay devices #1 through #3 (hereafter may be referred to as 'switches') and four external devices #1 through #4 (hereafter may be referred to as 'PCs'). These switches #1 through #3 are LAN switches having the bridge function and the router function. Although PCs (Personal Computers) are used as the external devices #1 through #4 in this embodiment, the external devices are not restricted to the PCs but may be any arbitrary devices, such as other LAN switches and home electric appliances having the network connecting function.

The switches #1 and #2 are interconnected by means of respective ports P112 and P221. Similarly the switches #2 and #3 are interconnected by means of respective ports P223 and P332, and the switches #3 and #1 are interconnected by means of respective ports P331 and P113. Such connections form a ring network of the three switches #1 through #3. The ports that connect with other LAN switches to form a ring network, such as the ports P112, P113, P221, and P331, are called ring ports. The PC #1 is connected to a port P101 of the switch #1. Similarly the PC #2 is connected to a port P102 of the switch #1, the PC #3 is connected to a port P201 of the switch #2, and the PC #4 is connected to a port P301 of the switch #3. The ports that do not contribute to formation of a ring network but simply connect with other LAN switches or personal computers, such as the ports P101, P102, P201, and P301, are called non-ring ports.

The ring protocol classifies switches constituting a ring network into master nodes and transit nodes. In the illustrated example of FIG. 1, the switch #1 is a master node, and the switches #2 and #3 are transit nodes. One of the ring ports of the master node is enabled to establish communication, while the other ring port is disabled to establish communication. In the illustrated example of FIG. 1, the port P112 of the switch #1 is set in a communication enabled state, while the port P113 is set in a communication disabled state. Such setting prevents frame looping in the network. In the illustrated example of FIG. 1, a packet to be sent from the PC #1 to the PC #3 is relayed through a route RT11, and a packet to be sent from the PC #1 to the PC #3 is relayed through a route RT12 passing through the switch #2.

FIGS. 2A and 2B are explanatory diagrammatic representations of flooding operations performed by the switch #1 after the occurrence of a failure. The switch #1 as the master node detects the occurrence of a failure and changes the setting of the port P113 from the communication disabled state to the communication enabled state. This establishes a physical communication route with other switches.

FIG. 2A shows flooding targets of a frame received by the switch #1 via the non-ring port P101. When receiving a frame that is to be sent from the PC #1 to the PC #3, the switch #1 performs a flooding operation to relay the received frame. The switch #1 sets the ring ports P112 and P113 as the flooding targets but excludes the non-ring port P102 from the flooding target, among all the ports other than the frame-receiving port P101. When receiving a frame that is to be sent from the PC #1 to the PC #2, on the other hand, the switch #1 sets both the ring ports P112 and P113 and the non-ring port P102 as the flooding targets, among all the ports other than the frame-receiving port P101.

FIG. 2B shows flooding targets of a frame received by the switch #1 via the ring port P113. When receiving a frame that is to be sent from the PC #4 to the PC #3, the switch #1 similarly performs a flooding operation. The switch #1 sets the ring port P112 as the flooding target but excludes the non-ring ports P101 and P102 from the flooding target, among all the ports other than the frame-receiving port P113. When receiving a frame that is to be sent from the PC #4 to the PC #1, on the other hand, the switch #1 sets both the ring ports P112 and the non-ring ports P101 and P102 as the flooding targets, among all the ports other than the frame-receiving port P113.

The switch #1 changes the flooding target according to the attribute of the transmit port sending the received frame (ring port or non-ring port), irrespective of the attribute of the frame-receiving port (ring port or non-ring port). After the switch #1 as the master node changes the setting of the port P113 from the communication disabled state to the communication enabled state, the switches #2 and #3 perform similar series of processing, which are not specifically explained here.

FIG. 3 is an explanatory diagrammatic representation of a relation between the flooding target and the transmit port. In the case where the transmit port sending the received frame is a ring port, the switch of the embodiment performs flooding with setting only the ring ports as the flooding target. Exclusion of the non-ring ports from the flooding target is reasonable from both the viewpoint of frame relay and the viewpoint of the route change in response to detection of a failure.

In the case where the transmit port sending the received frame is a non-ring port, on the other hand, the switch of the embodiment performs flooding with setting both the ring ports and the non-ring ports as the flooding target. Setting the non-ring ports as the flooding target is reasonable from the viewpoint of frame relay, while setting the ring ports as the flooding target is reasonable from the viewpoint of the route change in response to detection of a failure.

The switch of this embodiment performs flooding with a preset flooding target according to the attribute of a transmit port sending a received frame (ring port or non-ring port) as shown in FIG. 3. This arrangement desirably reduces the load of unnecessary flooding (more specifically, the flooding operation performed for non-ring ports when the transmit port sending the received frame is a ring port) on the frequency band. Exclusion of devices that do not require a frame sent by the flooding operation from the flooding target effectively enhances the security.

(A-2) System Configuration

Figure 4:
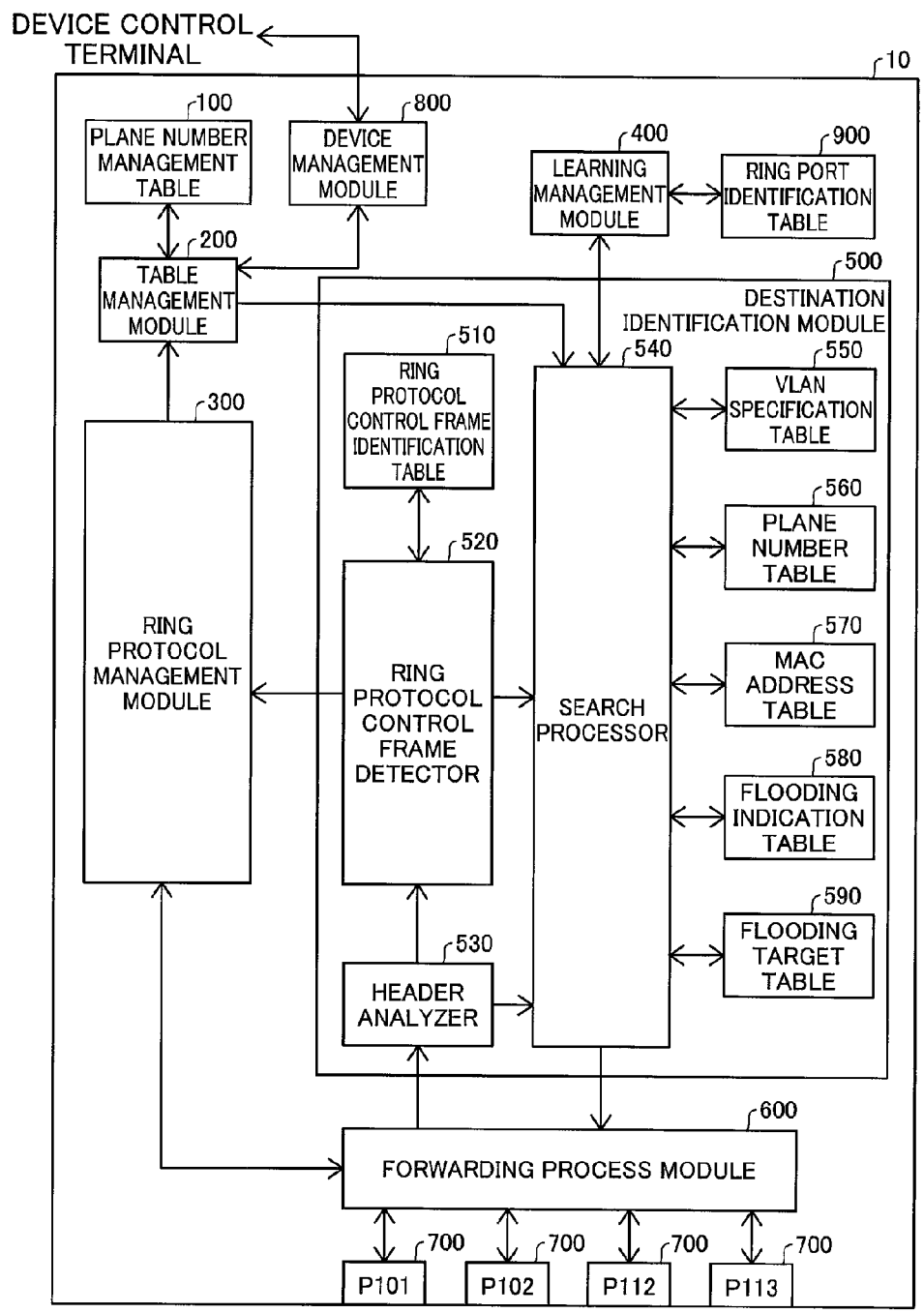
FIG. 4 is an explanatory diagrammatic representation of the general structure of a switch according to one embodiment of the invention.

FIG. 4 is an explanatory diagrammatic representation of the general structure of a switch 10 according to one embodiment of the invention. The switch 10 is equivalent to any of the switches #1 through #3 shown in FIG. 1 and has a plane number management table 100, a table management module 200, a ring protocol management module 300, a learning management module 400, a destination identification module 500, a forwarding process module 600, ports 700, a device management module 800, and a ring port identification table 900.

The plane number management table 100 stores currently active plane numbers in correlation with port numbers. The 'plane number' represents identification information used to identify each combination of information. The plane number will be described later in detail. The table management module 200 of the embodiment is equivalent to the table manager in the claims of the invention and has the function of managing the respective tables included in the switch 10. The device management module 800 of the embodiment is equivalent to the device manger in the claims of the invention and has the function of receiving and accepting a deletion request from a device control terminal as an external device connecting with the switch 10 and deleting learning information of a MAC address. The ring protocol management module 300 has the function of managing the ring protocol. The learning management module 400 of the embodiment is equivalent to the learning manager in the claims of the invention and has the function of managing a learning process performed in the switch 10. The ring port identification table 900 of the embodiment is equivalent to the port attribute storage in the claims of the invention and stores port attributes (ring port or non-ring port) in correlation with the respective ports included in the switch 10.

The destination identification module 500 has the function of performing a destination search of each frame received by the switch 10. The destination identification module 500 has a ring protocol control frame identification table 510, a ring protocol control frame detector 520, a header analyzer 530, a search processor 540, a VLAN specification table 550, a plane number table 560, a MAC address table 570, a flooding indication table 580, and a flooding target table 590. The ring protocol control frame identification table 510 is used for control of the ring protocol (for example, detection of a failure). The ring protocol control frame detector 520 refers to the ring protocol control frame identification table 510 and processes each control frame received by the switch 10. The header analyzer 530 analyzes header information of each received frame.

The VLAN specification table 550 is used to specify an intra-device VLAN number used only within the switch 10 corresponding to the port number of a frame-receiving port. The VLAN specification table 550 may be omitted according to the requirements. The plane number table 560 is used to specify the currently active plane number, like the plane number management table 100 mentioned above. The MAC address table 570 of the embodiment is equivalent to the MAC address storage in the claims of the invention and is used for a learning process and a destination search process described later. The flooding indication table 580 is equivalent to the flooding indication storage in the claims of the invention and is used to identify the requirement or the non-requirement of flooding. The flooding target table 590 is equivalent to the flooding target storage in the claims of the invention and has registries of flooding targets determined in advance according to the port attributes. The search processor 540 is equivalent to the frame processor in the claims of the invention and searches the respective tables with information of each received frame and determines the destination of the received frame (destination search process).

The forwarding process module 600 has the function of sending and receiving frames to and from external devices via the ports 700 and the function of forwarding frames to various components in the switch 10. The ports 700 work as interfaces of frame transmission and reception between the switch 10 and external devices connecting with the switch 10. The switch 10 of this embodiment has four ports 700 with identification codes or port numbers of P101, P102, P112, and P113. The number of ports and their identification codes are not restricted to this example but may be determined arbitrarily.

Figure 5:
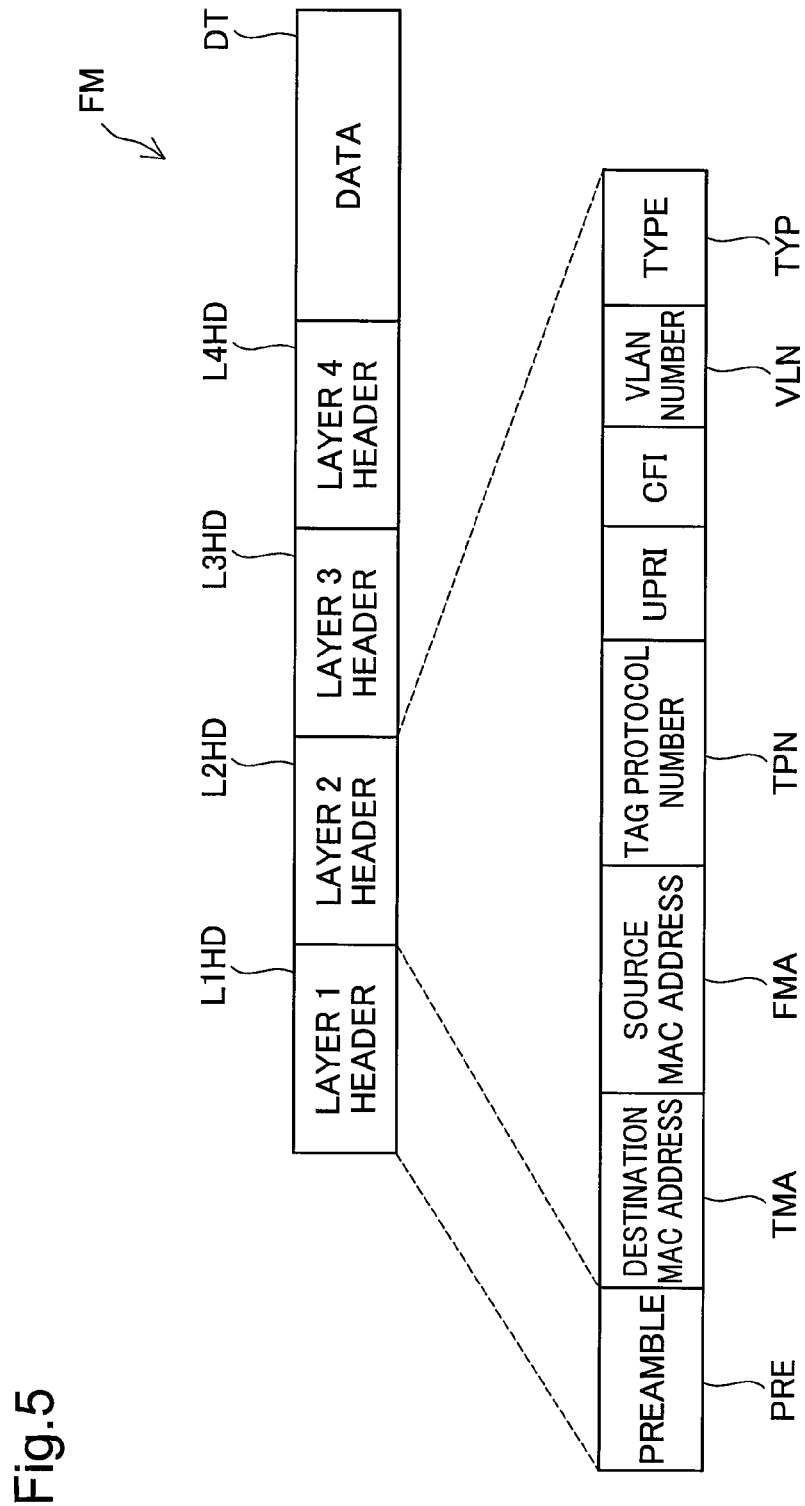
FIG. 5 is an explanatory diagrammatic representation of the structure of a data frame FM handled by the switch.

FIG. 5 is an explanatory diagrammatic representation of the structure of a data frame FM handled by the switch 10. The data frame FM includes a layer 1 header L1HD, a layer 2 header L2HD, a layer 3 header L3HD, a layer 4 header L4HD, and data DT. The layer 1 header L1HD includes a preamble PRE. The layer 2 header L2HD includes a destination MAC address TMA, a source MAC address FMA, a TAG protocol number TPN, UPRI, CFI, a VLAN number VLN, and a type TYP. A MAC address of a PC as a destination of the frame FM is registered in the destination MAC address TMA of the layer 2 header L2HD. A MAC address of a PC as a source or sender of the frame FM is registered in the source MAC address FMA. The TAG protocol number TPN, the UPRI, the CFI, and the VLAN number VLN may be omitted according to the requirements.

Figure 6:
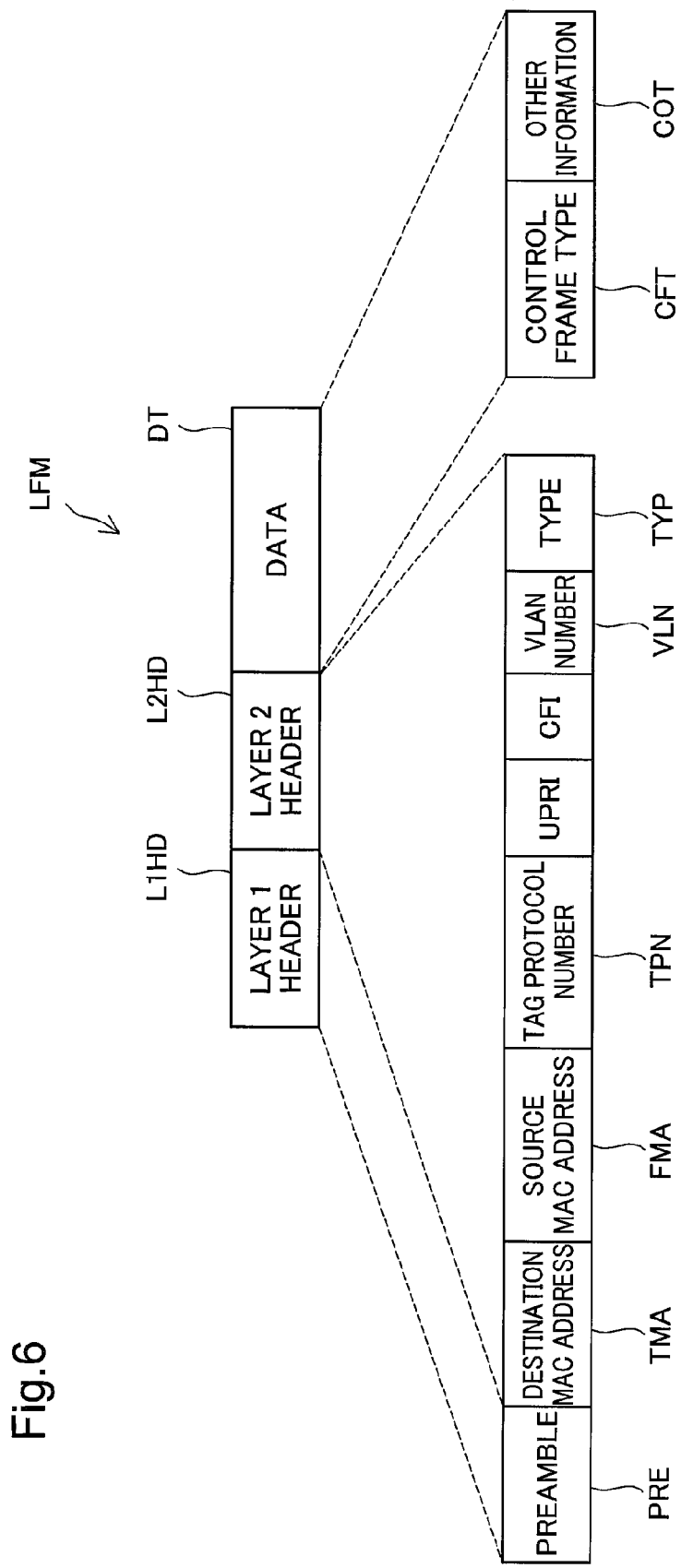
FIG. 6 is an explanatory diagrammatic representation of the structure of a ring protocol control frame LFM handled by the switched.

FIG. 6 is an explanatory diagrammatic representation of the structure of a ring protocol control frame LFM handled by the switched. The ring protocol control frame LFM includes a layer 1 header L1HD, a layer 2 header L2HD, and data DT. The layer 1 header L1HD and the layer 2 header L2HD have the same structures as those of FIG. 5. The data DT includes a control frame type CFT and other information COT. Information representing a type of each control frame (for example, health check frame or FDB flash frame) is registered in the control frame type CFT.

FIG. 7 is an explanatory diagrammatic representation of one example of the ring port identification table 900. The ring port identification table 900 stores port attributes (ring port or non-ring port) in correlation with the respective ports included in the switch 10. The ring port identification table 900 has a receiving port number field RPN and a port attribute field RPT. The receiving port number field RPN has registries of identification codes or port numbers of all the ports included in the switch 10. The port attribute field RPT has registries of identification codes representing port attributes of the respective ports registered in the receiving port number field RPN. In this embodiment, an identification code 'RP' is used to represent the ring port attribute, and an identification code 'NRP' is used to represent the non-ring port attribute. In the illustrated example of FIG. 7, the ports P101 and P102 are non-ring ports (NRP), and the ports P112 and P113 are ring ports (RP).

FIG. 8 is an explanatory diagrammatic representation of one example of the VLAN specification table 550. The VLAN specification table 550 is used to specify an intra-device VLAN number used only within the switch 10 corresponding to the frame-receiving port number. The VLAN specification table 550 has a receiving port number field VNP, a VLAN number field VNO, a type field VTY, and an intra-device VLAN number field VSN. The receiving port number field VNP has registries of port numbers of ports receiving respective frames as frame identification information. The VLAN number field VNO has registries of identification codes of belonging VLANs as the frame identification information. The type field VTY has registries of information to be registered in the type field TYP of the frame FM (FIG. 5) (information specifying an upper-layer protocol) as the frame identification information. The intra-device VLAN number field VSN has registries of identification codes of intra-device VLANs individually specified for the respective received frames. These conditional fields are only illustrative and not restrictive, and the VLAN specification table may be constructed to include any other suitable fields. For example, other pieces of information included in the frame FM may be added as conditional fields in the VLAN specification table. A symbol '*' registered in various conditional fields (receiving port number field VNP, VLAN number field VNO, and type field VTY) represents that any condition is acceptable.

FIG. 9 is an explanatory diagrammatic representation of one example of the plane number table 560. The plane number table 560 is used to specify the currently active plane number. The plane number table 560 has a port number field FNPT and a plane number field FNNO. The port number field FNPT has registries of identification codes or port numbers of all the ports included in the switch 10. The port number field FNPT is used as a key item for deleting information of correlating the transmit port to the MAC address from the MAC address table 570 as described later. The plane number field FNNO has registries of currently active plane numbers with regard to the respective ports registered in the port number field FNPT.

FIG. 10 is an explanatory diagrammatic representation of one example of the MAC address table 570. The MAC address table 570 stores multiple ports included in the switch 10 in correlation with MAC addresses of PCs as potential destinations of frame relay via the respective ports and is used for the learning process and the destination search process describe later. The MAC address table 570 has an intra-device VLAN number field MSN, a MAC address field MMA, a plane number field MFO, a port number field MPT, a port attribute field MTY, and a hit bit field MHB. The intra-device VLAN number field MSN has registries of intra-device VLAN numbers specified corresponding to the port numbers of ports receiving respective frames and the header information of the respective received frames. The MAC address field MMA has registries of MAC addresses of the respective PCs that belong to an identical subnet and may be designated as a destination. The plane number field MFO has registries of plane numbers (equal to an initial value '0' in this state) with regard to the respective ports registered in the port number field MPT. The port number field MPT has registries of port numbers of the transmit ports used for frame transmission to the respective PCs having the MAC addresses registered in the MAC address field MMA. The port attribute field MTY has registries of the identification codes representing the port attributes of the respective ports registered in the port number field MPT. The hit bit fielder MHB is used for a packet forwarding process described later.

FIG. 11 is an explanatory diagrammatic representation of one example of the flooding indication table 580. The flooding indication table 580 stores combinations of information (EG1, EG2, and EG3) or more specifically combinations of multiple pieces of information representing the requirement or the non-requirement of flooding individually determined with regard to port numbers of all the ports included in the switch 10. In the description hereafter, the combinations of information EG1 through EG3 are also referred to as 'information groups'. This illustrated example has three combinations of information. This number is, however, only illustrative and not restrictive, and there may be any arbitrary number of combinations of information.

The flooding indication table 580 has a plane number field FFO, a port number field FPT, and a flooding indication field FIN. The plane number field FFO has registries of plane numbers. In the illustrated example of FIG. 11, a plane number '0' is registered as an identification number of the combination of information EG1. Similarly a plane number '1' and a plane number '2' are respectively registered as an identification number of the combination of information EG2 and as an identification number of the combination of information EG3. The port number field FPT has registries of the identification codes or port numbers of all the ports included in the switch 10 with regard to each plane number. The flooding indication field FIN has registries of identification symbols representing a requirement of flooding and a non-requirement of flooding. A registered identification symbol 'FLD' represents the requirement of flooding, and a registered identification system '-' represents the non-requirement of flooding.

FIG. 12 is an explanatory diagrammatic representation of one example of the flooding target table 590. The flooding target table 590 stores flooding targets specified in advance with regard to each port attribute. The flooding target table 590 has a port attribute field FAPT, an intra-device VLAN number field FASN, and a transmit port number field FAPN. The port attribute field FAPT has registries of port attributes. The intra-device VLAN number field FASN has registries of intra-device VLAN numbers specified corresponding to the port numbers of ports receiving respective frames and the header information of the respective received frames. The transmit port number field FAPN has registries of port numbers as output directions of flooding frames. The flooding target table 590 is used to specify a combination of transmit port numbers determined corresponding to each intra-device VLAN number with regard to each port attribute. More specifically, the flooding target table 590 has two different lists NF and RF. The list NF shows combinations of information representing the flooding targets with regard to the non-ring port (NRP) registered in the port attribute field FAPT. The list RF shows combinations of information representing flooding targets with regard to the ring port (RP) registered in the port attribute field FAPT.

(A-3) Frame Forwarding Process

Figure 13:
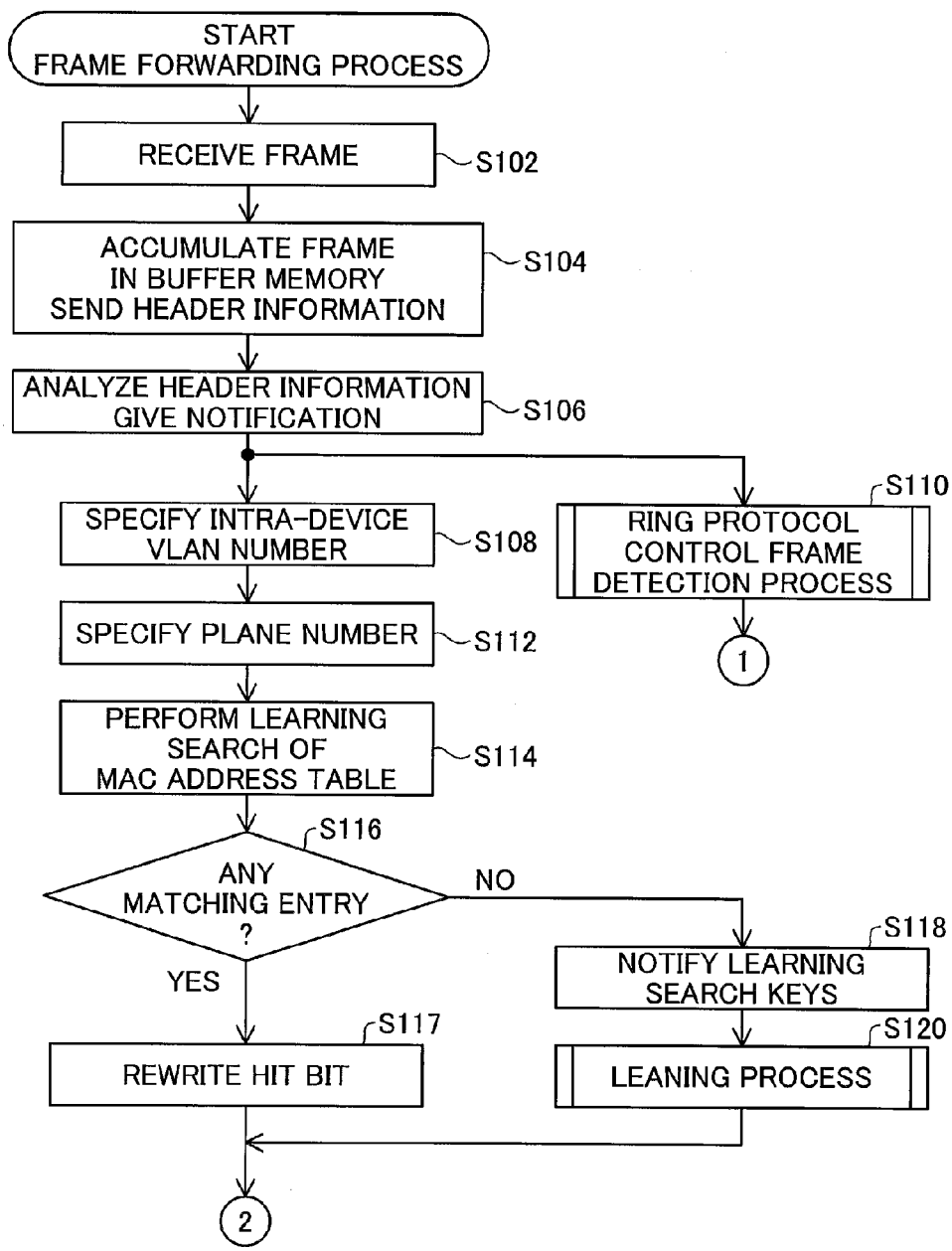
FIG. 13 is a flowchart showing a frame forwarding process.
Figure 14:
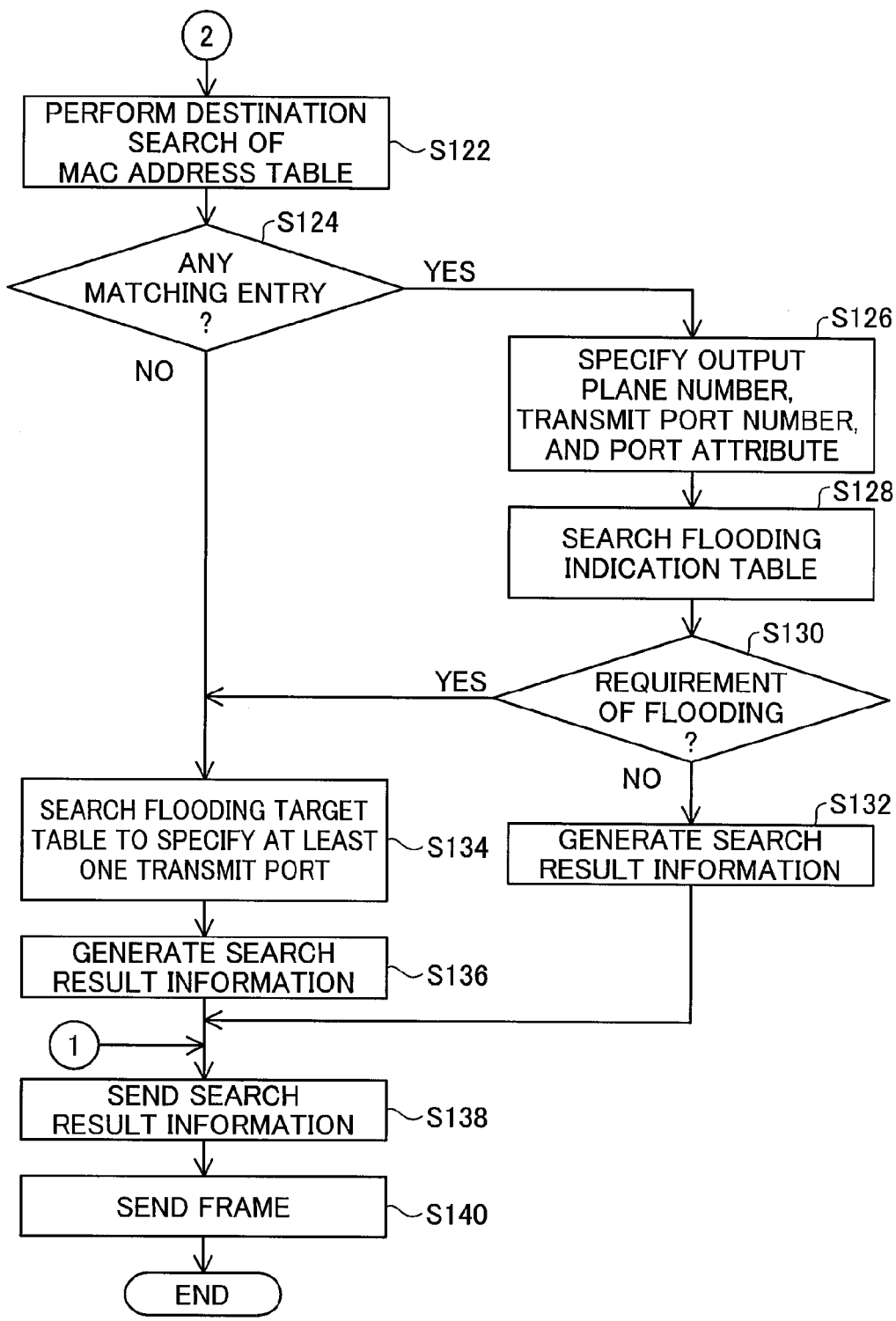
FIG. 14 is a flowchart showing a frame forwarding process.

FIGS. 13 and 14 are flowcharts showing a frame forwarding process. The forwarding process module 600 receives a frame FM via the port 700 at step S102 and accumulates the received frame FM into a buffer memory (not shown) within the forwarding process module 600 at step S104. At step S104, the forwarding process module 600 concurrently sends header information of the layer 2 header L2HD, the layer 3 header L3HD, and the layer 4 header L4HD included in the received frame FM and information on the port receiving the frame FM to the search processor 540.

At subsequent step S106, the header analyzer 530 analyzes the received header information and extracts required information. The required information to be extracted includes the destination MAC address TMA, the source MAC address FMA, the VLAN number VLN, and the type TPY of the layer 2 header L2HD. The header analyzer 530 subsequently notifies the search processor 540 and the ring protocol control frame detector 520 of the extracted information and the port number of the port receiving the frame FM at step S106. The ring protocol control frame detector 520 receiving the notification performs a ring protocol control frame detection process at step S110. The details of the ring protocol control frame detection process will be described later.

The search processor 540 notified of the header information specifies an intra-device VLAN number at step S108. More specifically, the search processor 540 searches the VLAN specification table 550 (FIG. 8) for any matching entry with the port number of the port receiving the frame FM and the VLAN number VLN and the type TYP included in the header information of the received frame FM as keys and specifies the registry in the intra-device VLAN number field VSN of the matching entry as the intra-device VLAN number. The search processor 540 specifies a plane number at step S112. More specifically, the search processor 540 searches the plane number table 560 (FIG. 9) for any matching entry with the port number of the port receiving the frame FM as a key and specifies the registry in the plane number field FNNO of the matching entry as the plane number.

The search processor 540 performs a learning search of the MAC address table 570 (FIG. 10) at step S114. More specifically, the search processor 540 searches the MAC address table 570 for any matching entry with a combination of learning search keys. The combination of learning search keys includes the port number of the port receiving the frame FM, the intra-device. VLAN number specified at step S108, the source MAC address FMA included in the layer 2 header L2HD, and the plane number specified at step S112. When there is no matching entry (step S116: No), the search processor 540 notifies the learning management module 400 of the combination of learning search keys at step S118. At subsequent step S120, the learning management module 400 performs a learning process. The details of the learning process will be described later. When there is any matching entry (step S116: Yes), on the other hand, the search processor 540 rewrites the registry in the hit bit field MHB of the matching entry to a value at step S117 and proceeds to step S122 in the flowchart of FIG. 14.

The port attribute may additionally be used as one of the learning search keys for the leaning search at step S114 in the flowchart of FIG. 13. This arrangement enables the registry in the port attribute field MTY in the MAC address table 570 to be updated in the learning process in response to a change of the port attribute. In this case, the search processor 540 is preferably arranged to have a table (of the same contents as those of the ring port identification table 900) used for retrieval of the port attribute corresponding to each frame-receiving port number.

Referring to the flowchart of FIG. 14, at step S122, the search processor 540 performs a destination search of the MAC address table 570. More specifically, the search processor 540 searches the MAC address table 570 (FIG. 10) for any matching entry with the destination MAC address TMA included in the layer 2 header L2HD and the intra-device VLAN number specified at step S108 (FIG. 13) as keys. When there is no matching entry (step S124: No), the processing flow proceeds to step S134. When there is any matching entry (step S124: Yes), the search processor 540 specifies the registries in the plane number field MFO, in the port number field MPT, and in the port attribute field MTY of the matching entry as an output plane number, as an output port number or transmit port number, and as a transmit port attribute at step S126.

The search processor 540 searches the flooding indication table 580 (FIG. 11) at step S128. More specifically, the search processor 540 searches the flooding indication table 580 for any matching entry with the transmit port number and the output plane number specified at step S126 as keys and obtains the registry in the flooding indication field FIN of the matching entry. The search processor 540 identifies the requirement or the non-requirement of flooding at step S130. When there is the non-requirement for flooding represented by the indication symbol '-' in the flooding indication field FIN (step S130: No), at subsequent step S132, the search processor 540 generates search result information indicating the transmit port number specified at step S126.

When there is the requirement for flooding represented by the indication symbol 'FLD' in the flooding indication field FIN (step S130: Yes) or when there is no matching entry as a result of the destination search (step S124: No), the search processor 540 specifies at least one transmit port at step S134. More specifically, the search processor 540 searches the flooding target table 590 (FIG. 12) for any matching entry with the intra-device VLAN number specified at step S108 (FIG. 13) and the transmit port attribute specified at step S126 as keys and specifies the registry in the transmit port number field FAPN of the matching entry as the at least one transmit port. At subsequent step S136, the search processor 540 functioning as the frame processor generates search result information indicating all the port numbers of the at least one transmit port specified at step S134 with exclusion of the frame-receiving port number, in order to perform a flooding operation.

The search processor 540 sends the search result information to the forwarding process module 600 at step S138. The forwarding process module 600 receives the search result information and sends a frame at step S140. More specifically, the forwarding process module 600 reads out frame information accumulated in the buffer memory and sends a frame to all the transmit ports as output directions indicated by the search result information.

(A-4) Learning Process

Figure 15:
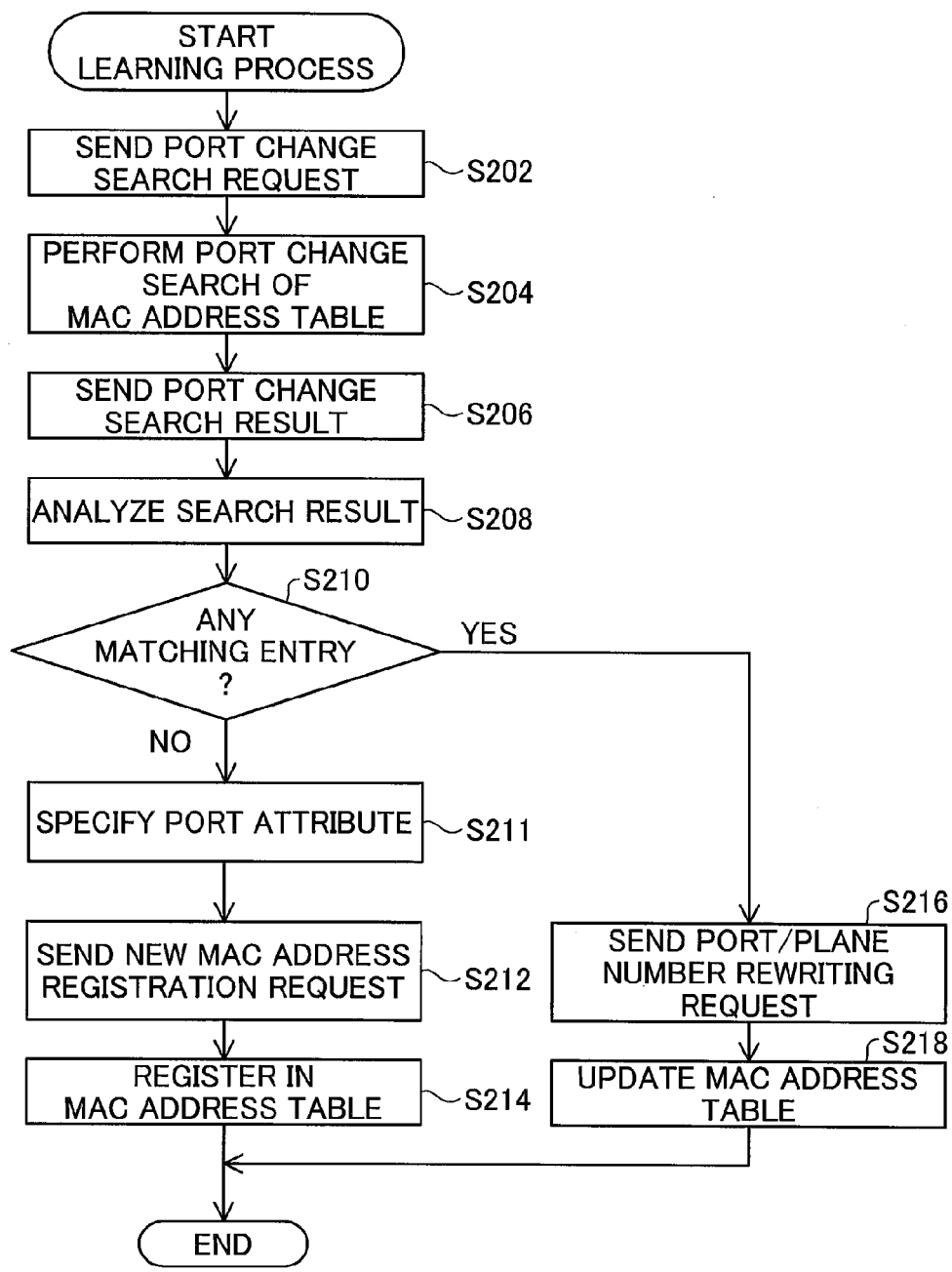
FIG. 15 is a flowchart showing the details of the learning process performed at step S120 in the flowchart of FIG. 13.

FIG. 15 is a flowchart showing the details of the learning process performed at step S120 in the flowchart of FIG. 13. The learning management module 400 sends a port change search request with port change search keys to the search processor 540 at step S202. Among the combination of learning search keys (the port number of the port receiving the frame FM, the intra-device VLAN number specified at step S108 (FIG. 13), the source MAC address FMA included in the layer 2 header L2HD, and the plane number specified at step S112 (FIG. 13)) notified to the learning management module 400 at step S118 in the flowchart of FIG. 13, the intra-device VLAN number specified at step S108 (FIG. 13) and the source MAC address FMA included in the layer 2 header L2HD are used as the port change search keys. In response to reception of the port change search request with the port change search keys, the search processor 540 performs a port change search of the MAC address table 570 (FIG. 10) at step S204. More specifically, the search processor 540 searches the MAC address table 570 for any matching entry with the port change search keys. The search processor 540 sends a result of the port change search (showing the presence or the absence of any matching entry) to the learning management module 400 at step S206. The learning management module 400 analyzes the received result of the port change search at step S208 and identifies whether there is any matching entry at step S210.

When there is no matching entry (step S210: No), the learning management module 400 specifies the port attribute at step S211. More specifically, the learning management module 400 searches the ring port identification table 900 (FIG. 7) for any matching entry with the port number of the port receiving the frame FM as a key and specifies the registry in the port attribute field RPT of the matching entry as the port attribute. At subsequent step S212, the learning management module 400 sends a new MAC address registration request with the learning search keys and the port attribute specified at step S211 as registration information to the search processor 540. In response to reception of the new MAC address registration request, the search processor 540 newly registers the received registration information into the MAC address table 570 at step S214.

When there is any matching entry (step S210: Yes), on the other hand, the learning management module 400 sends a port/plane number rewriting request to the search processor 540 at step S216. The port/plane number rewriting request is an update request of the MAC address table 570 using, among the combination of learning search keys, the intra-device VLAN number specified at step S108 (FIG. 13) and the source MAC address FMA included in the layer 2 header L2HD as search keys and the port number of the port receiving the frame FM and the plane number specified at step S112 (FIG. 13) as registration information. In response to reception of the port/plane number rewriting request, at step S218, the search processor 540 searches the MAC address table 570 for any matching entry with the received search keys and updates the registries in the plane number field MFO and in the port number field MPT of the matching entry respectively to the received plane number and the received port number.

In response to reception of a frame from an external device, the learning management module 400 newly registers the information of the received frame into the MAC address table 570 or updates the registry in the MAC address table 570 with the information of the received frame. This operation may be called the 'learning process'. This arrangement enables the registries in the MAC address table 570 to be updated with the information of the received frame, thereby eliminating the flooding state at the earlier timing and reducing the network traffic. In the learning process, the learning management module 400 retrieves the attribute of the frame-receiving port from the ring port identification table 900 and stores the retrieved port attribute in correlation with the port number in the MAC address table 570. Such registration enables the search processor 540 functioning as the frame processor to obtain both the information on the transmit port sending the received frame and on the attribute of the transmit port as a result of the destination search described above with reference to FIG. 14. This results in increasing the speed of frame forwarding process in the network relay apparatus.

FIG. 16 is an explanatory diagrammatic representation of one example of the ring protocol control frame identification table 510. The ring protocol control frame identification table 510 is used for detection of a failure in the ring protocol. The switch as the master node performs detection of a failure in the ring network. More specifically, the mater node switch makes a health check frame as one control frame go around the ring network. The normality of the network is detected, when the health check frame sent from the master node goes around the ring network and is returned to the master node. The occurrence of a failure somewhere on the route of the ring network is detected, on the other hand, when the health check frame is not returned to the master node. On detection of the occurrence of a failure, the master node makes a flash control frame for clearing the learning information of the MAC address go around the ring network. Each switch as the transit node receives this flash control frame and clears the learning information of the MAC address. This series of operations updates the route in the network.

FIG. 16 shows one example of the ring protocol control frame identification table 510 included in the mater node switch. The ring protocol control frame identification table 510 included in the transit node switch basically has the similar structure to that of FIG. 16, except omission of an entry E1 representing the health check frame.

The ring protocol control frame identification table 510 has an intra-device VLAN number field FDSN, a port number field FDPN, a MAC address field FDMA, a control frame type field FDFT, a frame processing type field FDPO, a notification condition field FDI, a timeout period field FDTT, a no-receiving period field FDNT, and a notification state field FDCD. The intra-device VLAN number field FDSN has registries of identification codes of belonging VLANs. The port number field FDPN has registries of port numbers of ports receiving respective frames. The MAC address field FDMA has registries of information to be registered in the destination MAC address field TMA of the received frame FM (FIG. 5). The control frame type field FDFT has registries of the types of respective control frames. An identification code 'HC' represents a health check frame, and an identification code 'FF' represents a flash control frame. The intra-device VLAN number field FDSN, the port number field FDPN, the MAC address field FDMA, and the control frame type field FDFT are used as conditional fields for identifying each control frame. A symbol '*' registered in the port number field FDPN represents that any condition is acceptable.

The frame processing type field FDPO has registries of the processing types of respective control frames. One processing type 'discard' means an operation of freeing the buffer memory without forwarding the received frame. Another processing type 'forward' means an operation of forwarding the received frame via the forwarding process module 600. The notification condition field FDI has registries of notification conditions used in the ring protocol control frame detection process described below. The timeout period field FDTT has registries of timeout periods used in a health check reception monitor process (discussed later) in the switch 10 working as the master node. The no-receiving period field FDNT has registries of frame no-receiving periods used in the health check reception monitor process. The notification state field FDCD has registries of information showing whether the detection of a failure has been notified to the ring protocol management module 300.

(A-5) Ring Protocol Control Frame Detection Process

Figure 17:
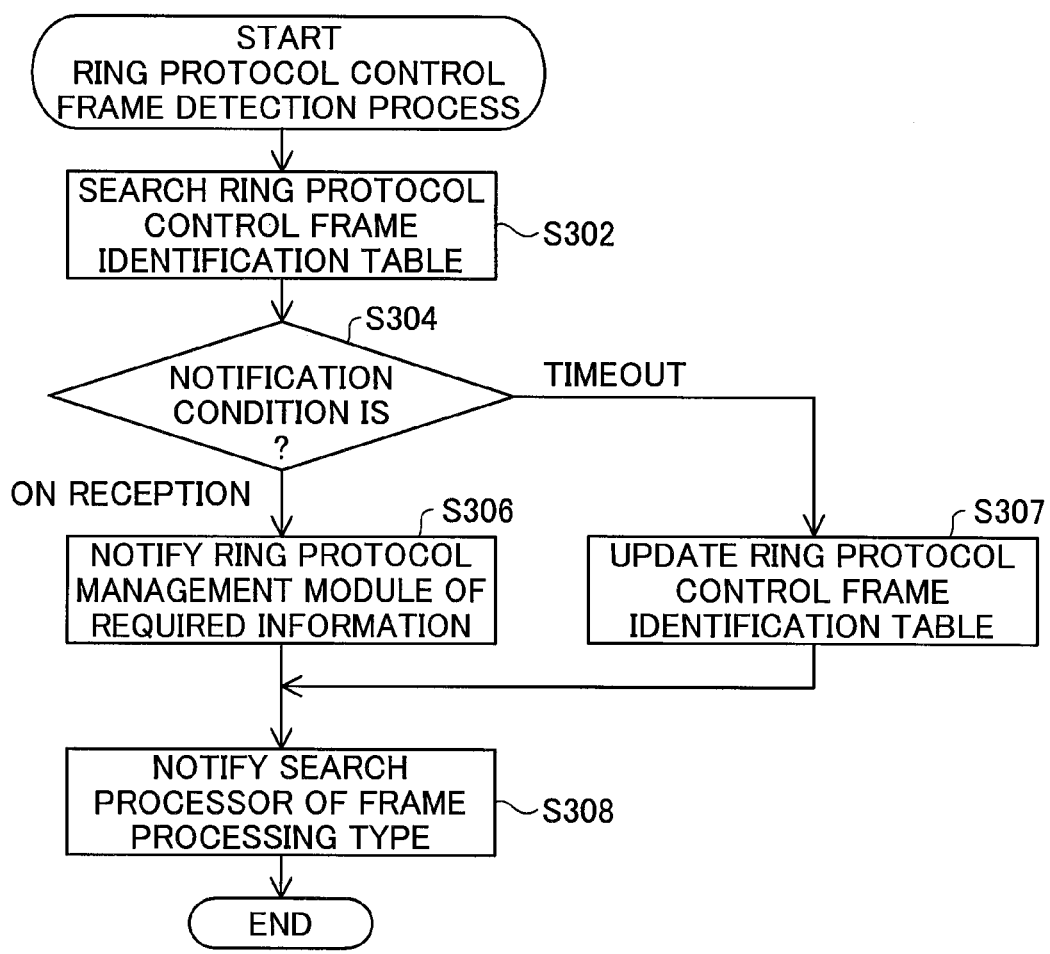
FIG. 17 is a flowchart showing the details of the ring protocol control frame detection process performed at step S110 in the flowchart of FIG. 13.

FIG. 17 is a flowchart showing the details of the ring protocol control frame detection process performed at step S110 in the flowchart of FIG. 13. Reception of a control frame by the switch 10 triggers the ring protocol control frame detection process to detect the control frame. Typical examples of the control frame include the health check frame and the flash control frame described previously with reference to FIG. 16. At step S302, the ring protocol control frame detector 520 searches the ring protocol control frame identification table 510. More specifically, the ring protocol control frame detector 520 searches the ring protocol control frame identification table 510 (FIG. 16) for any matching entry with the intra-device VLAN number specified at step S108 (FIG. 13), the port number of the port receiving the control frame LFM (FIG. 6), and the destination MAC address TMA of the layer 2 header L2HD and the control frame type CFT of the data DT included in the received control frame LFM as keys. The ring protocol control frame detector 520 obtains the registries in the frame processing type field FDPO and in the notification condition field FDI of the matching entry.

At step S304, the ring protocol control frame detector 520 specifies the notification condition based on the obtained registry in the notification condition field FDI. When the specified notification condition is 'on reception' at step S304, the ring protocol control frame detector 520 notifies the ring protocol management module 300 of required information at step S306. More specifically, the ring protocol control frame detector 520 notifies the ring protocol management module 300 of the port number of the port receiving the frame LFM, the header information of the received frame LFM, the intra-device VLAN number specified at step S108 (FIG. 13), and other required pieces of information. When the specified notification condition is 'timeout' at step S304, on the other hand, the ring protocol control frame detector 520 updates the registry in the no-receiving period field FDNT of the matching entry to '0' in the ring protocol control frame identification table 510 at step S307. This resets the no-receiving period since the frame is received. At subsequent step S308, the ring protocol control frame detector 520 notifies the search processor 540 of the frame processing type. When the notified frame processing type represents 'discard', the search processor 540 notifies the forwarding process module 600 of the requirement of 'discard' and thereby causes the forwarding process module 600 to delete the relevant frame accumulated in the buffer memory. When the notified frame processing type represents 'forward', on the other hand, the search processor 540 notifies the forwarding process module 600 of the requirement of 'forward' and thereby causes the forwarding process module 600 to forward the relevant frame accumulated in the buffer memory to the ring protocol management module 300.

(A-6) Health Check Reception Monitor Process

Figure 18:
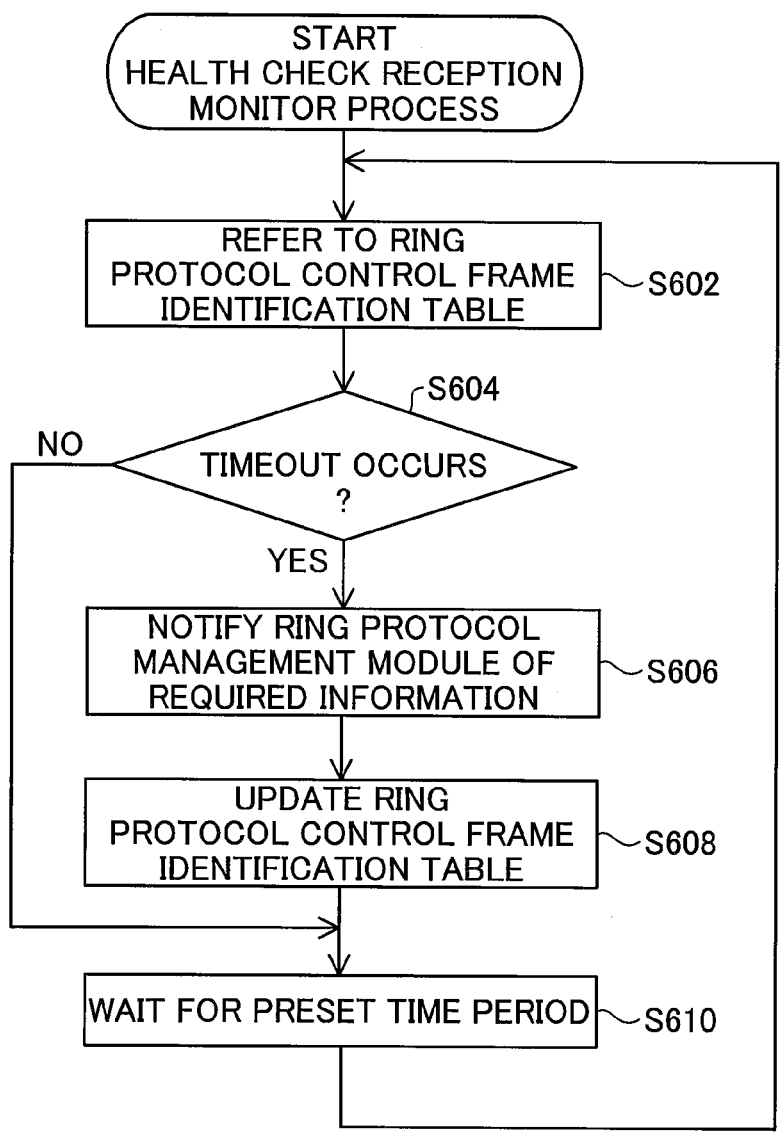
FIG. 18 is a flowchart showing a health check reception monitor process.

FIG. 18 is a flowchart showing a health check reception monitor process. The health check reception monitor process is performed independently of the frame forwarding process described above with reference to the flowcharts of FIGS. 13 and 14. The ring protocol control frame detector 520 refers to the registries in the ring protocol control frame identification table 510 at step S602. More specifically, the ring protocol control frame detector 520 searches the ring protocol control frame identification table 510 for any matching entry having the registry 'timeout' in the notification condition field FDI and the registry 'not notified' in the notification state field FDCD and obtains the registries in the timeout period field FDTT and the no-receiving period field FDNT of the matching entry. The ring protocol control frame detector 520 subsequently determines whether the timeout occurs at step S604. On the occurrence of no timeout (timeout period FDTT<no-receiving period FDNT), the processing flow proceeds to step S610.

On the occurrence of timeout (timeout period FDTT≧no-receiving period FDNT), on the other hand, the ring protocol control frame detector 520 notifies the ring protocol management module 300 of required information at step S606. More specifically, the ring protocol control frame detector 520 notifies the ring protocol management module 300 of the registries in the intra-device VLAN number field FDSN and in the frame processing type field FDPO of the matching entry and other required pieces of information. The ring protocol management module 300 notified of such information performs a protocol control process described below. At subsequent step S608, the ring protocol control frame detector 520 updates the registry in the notification state field FDCD of the matching entry to 'notified' in the ring protocol control frame identification table 510. This manages the requirement or the non-requirement of notification to the ring protocol management module 300 after detection of the occurrence of timeout (i.e., after detection of a failure). At step S610, the ring protocol control frame detector 520 waits for a preset time period and goes back to step S602.

(A-7) Protocol Control Process

Figure 19:
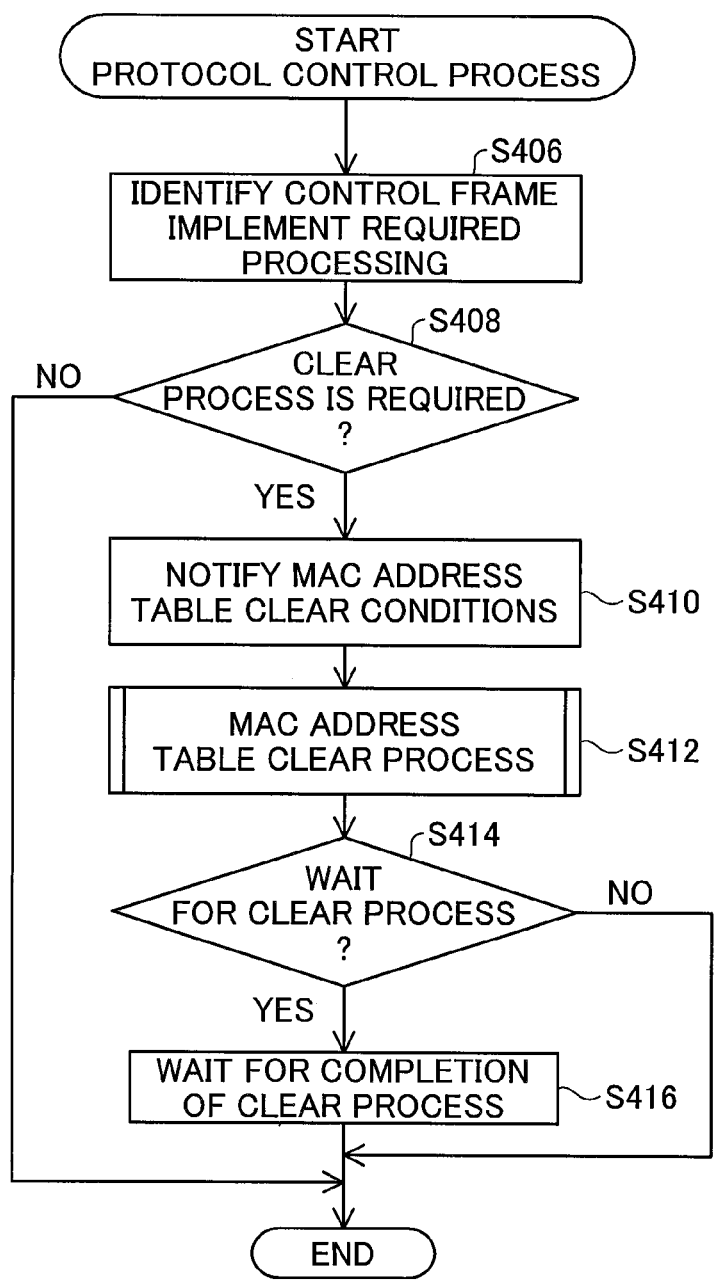
FIG. 19 is a flowchart showing a protocol control process.

FIG. 19 is a flowchart showing a protocol control process. The ring protocol management module 300 notified of the required information at step S606 in the flowchart of FIG. 18 starts the protocol control process. At step S406, the ring protocol management module 300 identifies the type of the received control frame (for example, the health check frame or the flash control frame) and implements a required series of processing. On completion of the required processing, the ring protocol management module 300 determines whether a clear operation of the MAC address table 570 (discussed later) is required at step S408. Information representing the requirement or the non-requirement of the clear operation of the MAC address table 570 is registered in advance in the control frame. Upon non-requirement of the clear operation of the MAC address table 570 (step S408: No), the protocol control process is terminated. Upon requirement of the clear operation of the MAC address table 570 (step S408: Yes), on the other hand, the ring protocol management module 300 notifies the table management module 200 of the conditions used for the clear operation of the MAC address table 570 at step S410. The conditions used for the clear operation of the MAC address table 570 include a key item (an item 'port number' in this embodiment) used for deletion of information from the MAC address table 570 and an element of the key item (a 'concrete port number' in this embodiment) for identifying a target of information deletion from the MAC address table 570.

At subsequent step S412, the ring protocol management module 300 requests the table management module 200 to perform a MAC address table clear process. The details of the MAC address table clear process will be discussed later. The ring protocol management module 300 then determines whether to wait or not wait for completion of the MAC address table clear process at step S414. Upon determination of no wait for the MAC address table clear process (step S414: No), the protocol control process is terminated. Upon determination of wait for the MAC address table clear process (step S414: Yes), on the other hand, the ring protocol management module 300 waits for completion of the MAC address table clear process at step S416 and terminates the protocol control process.

Figure 20:
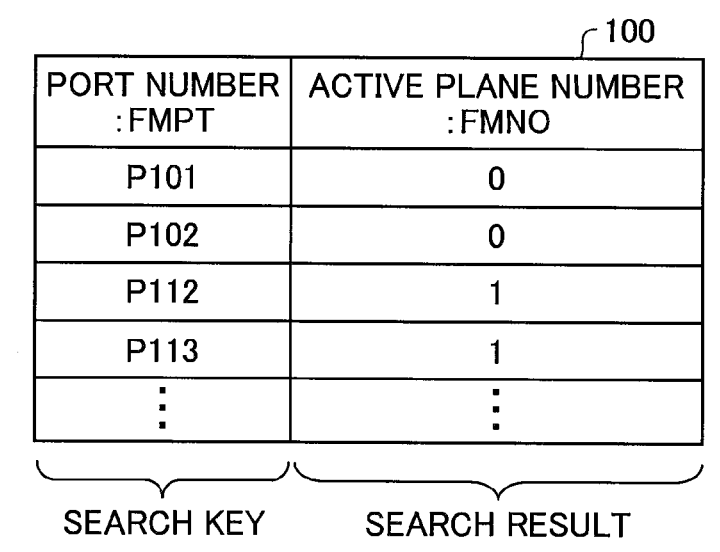

FIG. 20 is an explanatory diagrammatic representation of one example of the plane number management table 100. The plane number management table 100 stores currently active plane numbers in correlation with port numbers. The plane number management table 100 has a port number field FMPT and an active plane number field FMNO. The port number field FMPT has registries of identification codes or port numbers of all the ports included in the switch 10. The active plane number field FMNO has registries of currently active plane numbers (equal to an initial value '0' in this state) with regard to the respective ports having the port numbers registered in the port number field FMPT. The plane number will be described later in detail. One of the plane number management table 100 and the plane number table 560 may be omitted and the other may be used for both the purposes.

(A-8) MAC Address Table Clear Process

Figure 21:
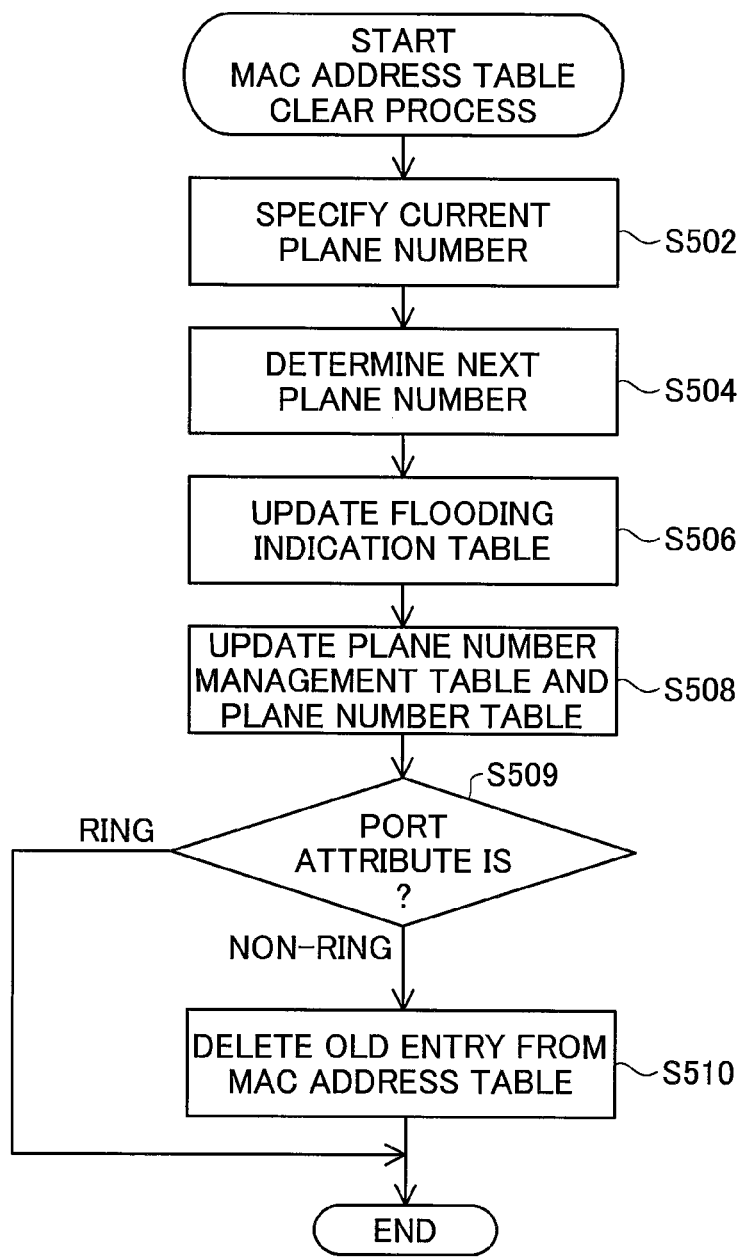
FIG. 21 is a flowchart showing the details of the MAC address table clear process performed at step S412 in the flowchart of FIG. 19.

FIG. 21 is a flowchart showing the details of the MAC address table clear process performed at step S412 in the flowchart of FIG. 19. The table management module 200 specifies the currently active plane number as a current plane number Ma at step S502. More specifically, the table management module 200 searches the plane number management table 100 (FIG. 20) for any matching entry with the element of the key item (the concrete port number in this embodiment) notified at step S410 of FIG. 19 as a key and specifies the registry in the active plane number field FMNO of the matching entry as the current plane number Ma. At subsequent step S504, the table management module 200 determines a next plane number Mb to be used next. The next plane number Mb may be determined by adding a preset numeral (for example, 1) to the current plane number Ma. A list of candidates for the next plane number MB may be provided, and any arbitrary number may be selected from the list as the next plane number Mb. Any other suitable method may be adopted for determining the next plane number Mb. In the description below, the current plane number Ma may be referred to as current identification information, and the next plane number Mb may be referred to as next identification information.

At subsequent step S506, the table management module 200 updates the flooding indication table 580 (FIG. 11). More specifically, the following series of steps i and ii are performed to update the flooding indication table 580:

Step i) The table management module 200 searches the flooding indication table 580 for any matching entry with the current plane number Ma and the element of the key item (the concrete port number in this embodiment) notified at step S410 of FIG. 19 as keys, and changes the registry in the flooding indication field FIN of the matching entry to the indication symbol 'FLD' representing the requirement of flooding.

Step ii) The table management module 200 searches the flooding indication table 580 for any matching entry with the next plane number Mb and the element of the key item (the concrete port number in this embodiment) notified at step S410 of FIG. 19 as keys, and changes the registry in the flooding indication field FIN of the matching entry to the indication symbol '-' representing the non-requirement of flooding.

The table management module 200 then updates the plane number management table 100 (FIG. 20) and the plane number table 560 (FIG. 9) at step S508. More specifically, the table management module 200 searches the plane number management table 100 for any matching entry with the element of the key item (the concrete port number in this embodiment) notified at step S410 of FIG. 19 as a key, and updates the registry in the active plane number field FMNO of the matching entry to the next plane number Mb. The table management module 200 also searches the plane number table 560 for any matching entry with the same element of the key item, and updates the registry in the plane number field FNNO of the matching entry to the next plane number Mb.

At subsequent step S509, the table management module 200 identifies the port attribute corresponding to the element of the key item (the concrete port number in this embodiment) notified at step S410 of FIG. 19. More specifically, the table management module 200 retrieves the port attribute of a matching entry with the element of the key item from a table (not shown) of the same contents as those of the ring port identification table 900, which is stored in the table management module 200. When the identified port attribute of the matching entry is the ring port (RP) at step S509, the table management module 200 terminates the MAC address table clear process. When the identified port attribute of the matching entry is the non-ring port (NRP) at step S509, on the other hand, the table management module 200 deletes any old entry from the MAC address table 570 (FIG. 10) at step S510. More specifically, the table management module 200 searches the MAC address table 570 for any matching entry with the current plane number Ma and the element of the key item (the concrete port number in this embodiment) notified at step S410 of FIG. 19 as keys, and deletes all the matching entries.

When the port attribute of a matching entry registered in the MAC address table 570 coincides with a specified attribute (the ring port attribute in this embodiment), the table management module 200 does not delete the matching entry or corresponding information from the MAC address table 570 as the MAC address storage, even on reception of a request for deleting the corresponding information of the concrete port number in correlation with a MAC address from the MAC address table 570. Non-deletion of such information enables the search processor 540 as the frame processor to specify the attribute of the transmit port sending the received frame as a result of the destination search of the MAC address table 570 (step S126 in FIG. 14). The frame processor is allowed to perform flooding with the preset flooding target according to the attribute of the transmit port sending the received frame. This arrangement desirably reduces the load of unnecessary flooding on the frequency band, while enhancing the security. Any entry that is not deleted in the MAC address table clear process may be deleted by a MAC address table aging process described below. When the port attribute of a matching entry does not coincide with the specified attribute but is the non-ring port attribute, on the other hand, the table management module 200 deletes the matching entry as old information from the MAC address table 570. This arrangement desirably prevents the useless resource consumption of the non-required information.

(A-9) MAC Address Table Aging Process

Figure 22:
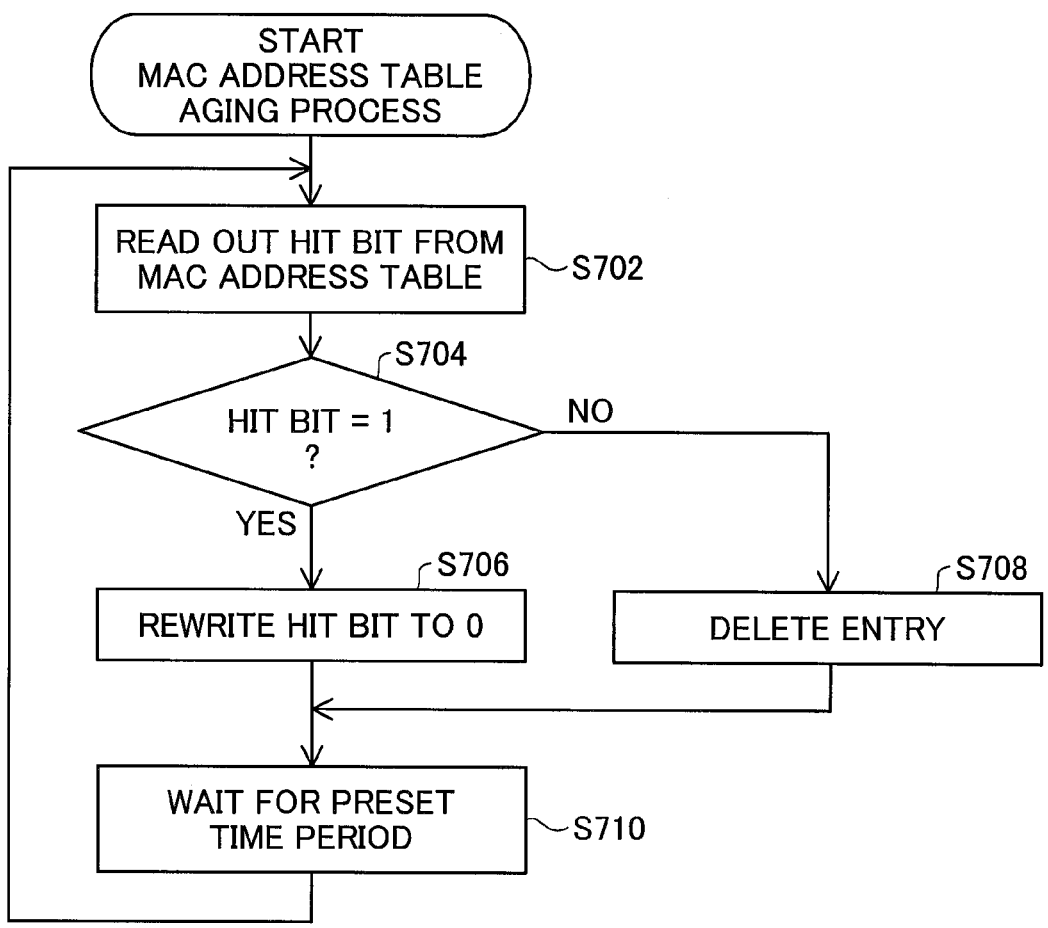
FIG. 22 is a flowchart showing a MAC address table aging process.

FIG. 22 is a flowchart showing a MAC address table aging process. The MAC address table aging process is performed independently of the other series of processing to delete any non-used entry from the MAC address table 570. The table management module 200 reads out the registry in the hit bit field MHB of each entry from the MAC address table 570 via the search processor 540 at step S702 and determines whether the registry in the hit bit field MHB is equal to 1 at step S704. When the registry in the hit bit field MHB is equal to 1 (step S704: Yes), the table management module 200 updates the registry in the hit bit field MHB of the entry to '0' at step S706 and proceeds to step S710. When the registry in the hit bit field MHB is not equal to 1 but is equal to 0 (step S704: No), on the other hand, the table management module 200 deletes the entry from the MAC address table 570 at step S708 and proceeds to step S710. The entry having the registry of '0' in the hit bit field MHB is a non-used entry. The table management module 200 waits for a preset time period at step S710 and goes back to step S702.

The processing flow of step S702 to step S706 (or to step S708) is performed individually with regard to all the entries in the MAC address table 570. The MAC address table aging process detects the use or the non-use of each MAC address entry in a relatively long time span and deletes any unused entry. This arrangement desirably prevents the useless resource consumption of the non-required information.

(A-10) Request-Based MAC Address Table Clear Process

Figure 23:
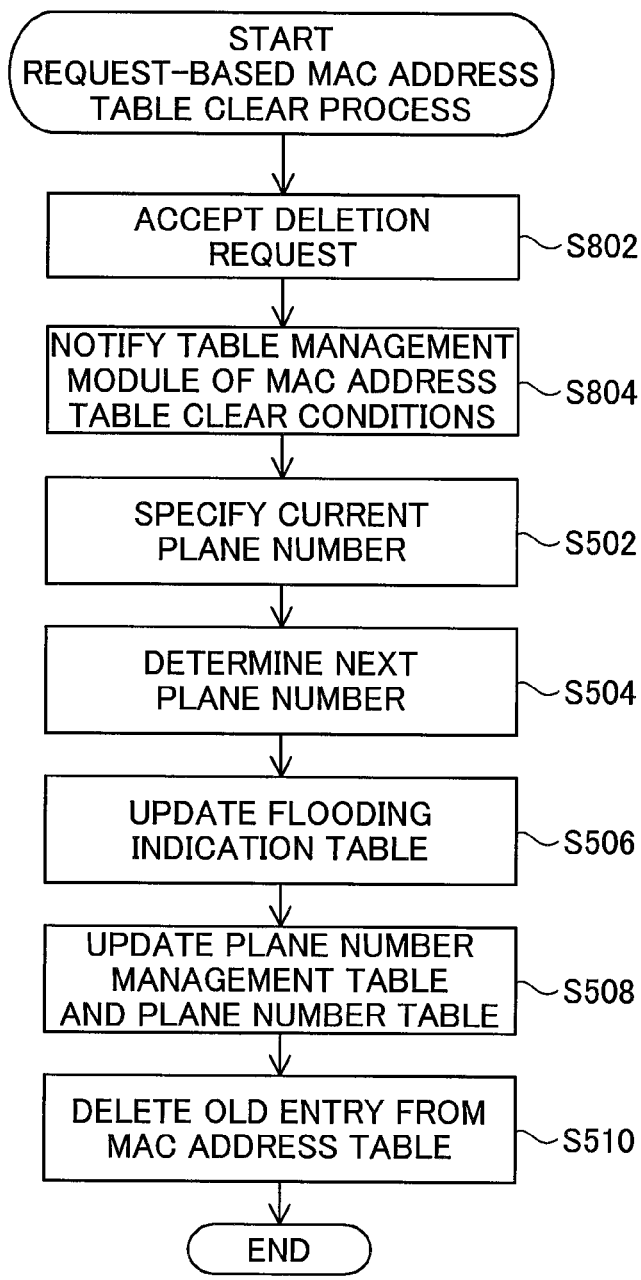
FIG. 23 is a flowchart showing a request-based MAC address table clear process.

FIG. 23 is a flowchart showing a request-based MAC address table clear process. The difference from the MAC address table clear process described above with reference to FIG. 21 is addition of steps S802 and S804 prior to step S502 and deletion of step S509. Otherwise the request-based MAC address table clear process of FIG. 23 is similar to the MAC address table clear process of FIG. 21 and is not specifically explained here.

The device management module 800 receives and accepts a deletion request from a device control terminal as an external device connecting with the switch 10 at step S802. The deletion request includes the element of the key item (the concrete port number in this embodiment) as a target of information deletion from the MAC address table 570. The device management module 800 subsequently notifies the table management module 200 of conditions used for the clear operation of the MAC address table 570 at step S804. The conditions used for the clear operation of the MAC address table 570 include the key item (the item 'port number' in this embodiment) used for deletion of information from the MAC address table 570 and the element of the key item (the 'concrete port number' in this embodiment) for identifying a target of information deletion from the MAC address table 570.

The request-based MAC address table clear process deletes the non-required information from the MAC address table 570 as the MAC address storage, in response to a deletion request from the external device. This arrangement enables the remaining non-required information to be deleted at any arbitrary timing, thus assuring the flexible network operation.

As described above, the switch 10 of the first embodiment performs flooding with a preset flooding target according to the attribute of a transmit port sending a received frame (ring port or non-ring port). This arrangement desirably reduces the load of unnecessary flooding (more specifically, the flooding operation performed for non-ring ports when the transmit port sending the received frame is a ring port) on the frequency band. Exclusion of devices that do not require a frame sent by the flooding operation from the flooding target effectively enhances the security.

B. Second Embodiment

Figure 24:
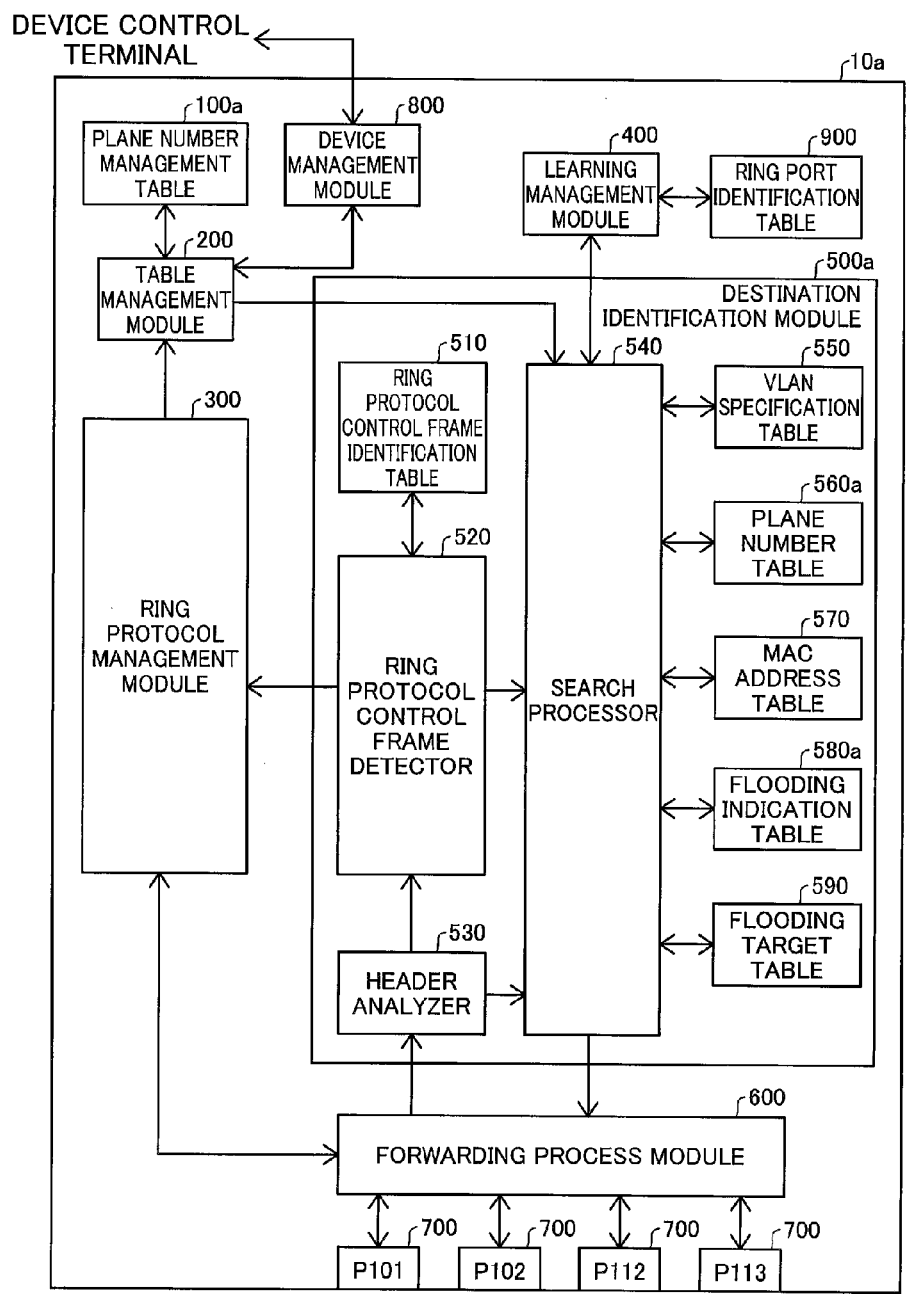
FIG. 24 is an explanatory diagrammatic representation of the general structure of a switch according to a second embodiment of the invention.

FIG. 24 is an explanatory diagrammatic representation of the general structure of a switch 10*a* according to a second embodiment of the invention. The switch 10*a* of the second embodiment basically has the similar structure and operations to those of the switch 10 of the first embodiment described above with reference to FIG. 4, except a plane number management table 100*a*, a plane number table 560*a*, and a flooding indication table 580*a* used in place of the plane number management table 100, the plane number table 560, and the flooding indication table 580.

FIG. 25 is an explanatory diagrammatic representation of one example of the plane number table 560*a* in the second embodiment. The only difference from the plane number table 560 of the first embodiment shown in FIG. 9 is an intra-device VLAN number field FNSN as the key item, instead of the port number field FNPT. Otherwise the structure of the plane number table 560*a* of the second embodiment is similar to that of the plane number table 560 of the first embodiment. The intra-device VLAN number field FNSN has registries of identification codes of intra-device VLANs individually specified for the respective received frames. In the second embodiment, the intra-device VLAN number is used as the key item for information deletion from the MAC address table 570. In the frame forwarding process of FIG. 13, at step S112, the search processor 540 searches the plane number table 560*a* for any matching entry with the intra-device VLAN number specified at step S108, instead of the port number of the port receiving the frame FM, as a key and specifies the registry in the plane number field FNNO of the matching entry as the plane number.

FIG. 26 is an explanatory diagrammatic representation of one example of the flooding indication table 580*a* in the second embodiment. The only difference from the flooding indication table 580 of the first embodiment shown in FIG. 11 is an intra-device VLAN number field FSN as the key item, instead of the port number field FPT. Otherwise the structure of the flooding indication table 580*a* of the second embodiment is similar to that of the flooding indication table 580 of the first embodiment. The intra-device VLAN number field FSN has registries of identification codes of intra-device VLANs individually specified for the respective received frames. In the frame forwarding process of FIG. 14, at step S128, the search processor 540 searches the flooding indication table 580*a* for any matching entry with the output plane number and the intra-device VLAN number specified at step S108 (FIG. 13), instead of the transmit port number specified at step S126, as keys and obtains the registry in the flooding indication field FIN of the matching entry.

FIG. 27 is an explanatory diagrammatic representation of one example of the plane number management table 100*a* in the second embodiment. The only difference from the plane number management table 100 of the first embodiment shown in FIG. 20 is an intra-device VLAN number field FMSN as the key item, instead of the port number field FMPT. Otherwise the structure of the plane number management table 100*a* of the second embodiment is similar to that of the plane number management table 100 of the first embodiment. The intra-device VLAN number field FMSN has registries of identification codes of intra-device VLANs individually specified for the respective received frames. In the protocol control process of FIG. 19, at step S410, the ring protocol management module 300 notifies the table management module 200 of a key item 'intra-device VLAN number' and an element 'concrete intra-device VLAN number' as the conditions used for the clear operation of the MAC address table 570.

In the second embodiment, the intra-device VLAN number is used as the key item, instead of the port number. The port number and the intra-device VLAN number are only illustrative examples of the key item. The key item may be set arbitrarily. For example, a link aggregation group number representing a link aggregation group may be used as the key item. In this case, the plane number table 560, the flooding indication table 580, the plane number management table 100, and the MAC address table 570 are modified to have a field having registries of link aggregation group numbers as in the case of the second embodiment using the intra-device VLAN number as the key item. The link aggregation group number is used as the search key in retrieval of the respective tables.

A combination of two or more items selected among the port number, the intra-device VLAN number, and the link aggregation group number may be set as the key items. This arrangement enables the key item to be set adequately according to the characteristics of the communication protocol implemented on the network relay apparatus.

C. Third Embodiment

Figure 28:
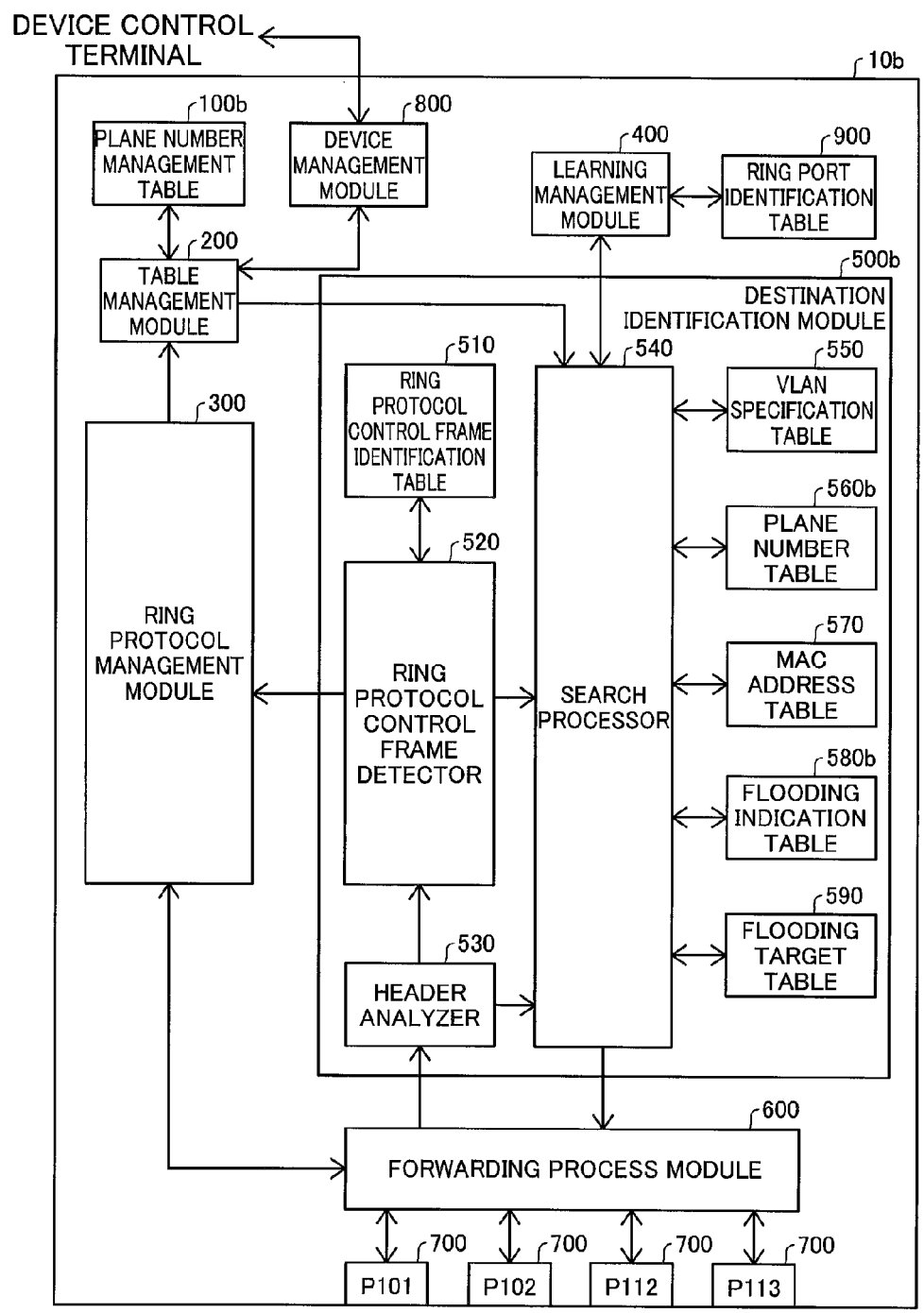
FIG. 28 is an explanatory diagrammatic representation of the general structure of a switch according to a third embodiment of the invention.

FIG. 28 is an explanatory diagrammatic representation of the general structure of a switch 10*b* according to a third embodiment of the invention. The switch 10*b* of the third embodiment basically has the similar structure and operations to those of the switch 10 of the first embodiment described above with reference to FIG. 4, except a plane number management table 100*b*, a plane number table 560*b*, and a flooding indication table 580*b* used in place of the plane number management table 100, the plane number table 560, and the flooding indication table 580.

FIG. 29 is an explanatory diagrammatic representation of one example of the plane number table 560*b* in the third embodiment. The only difference from the plane number table 560 of the first embodiment shown in FIG. 9 is an intra-device VLAN number field FNSN as the key item, in addition to the port number field FNPT. Otherwise the structure of the plane number table 560*b* of the third embodiment is similar to that of the plane number table 560 of the first embodiment. In the frame forwarding process of FIG. 13, at step S112, the search processor 540 searches the plane number table 560*b* for any matching entry with at least one of the port number of the port receiving the frame FM and the intra-device VLAN number specified at step S108 as a key and specifies the registry in the plane number field FNNO of the matching entry as the plane number.

FIG. 30 is an explanatory diagrammatic representation of one example of the flooding indication table 580*b* in the third embodiment. The only difference from the flooding indication table 580 of the first embodiment shown in FIG. 11 is an intra-device VLAN number field FSN as the key item, in addition to the port number field FPT. Otherwise the structure of the flooding indication table 580*b* of the third embodiment is similar to that of the flooding indication table 580 of the first embodiment. In the frame forwarding process of FIG. 14, at step S128, the search processor 540 searches the flooding indication table 580*b* for any matching entry with the output plane number and at least one of the transmit port number specified at step S126 and the intra-device VLAN number specified at step S108 (FIG. 13) as keys and obtains the registry in the flooding indication field FIN of the matching entry.

FIG. 31 is an explanatory diagrammatic representation of one example of the plane number management table 100*b* in the third embodiment. The only difference from the plane number management table 100 of the first embodiment shown in FIG. 20 is an intra-device VLAN number field FMSN as the key item, in addition to the port number field FMPT. Otherwise the structure of the plane number management table 100*b* of the third embodiment is similar to that of the plane number management table 100 of the first embodiment. In the protocol control process of FIG. 19, at step S410, the ring protocol management module 300 notifies the table management module 200 of at least one of the key items 'port number' and 'intra-device VLAN number' and at least one of the elements of the key items 'concrete port number' and 'concrete intra-device VLAN number' as the conditions used for the clear operation of the MAC address table 570.

In the third embodiment, either one or both of the port number and the intra-device VLAN number may be used as the key item. This assures the more detailed control.

D. Fourth Embodiment

Figure 32:
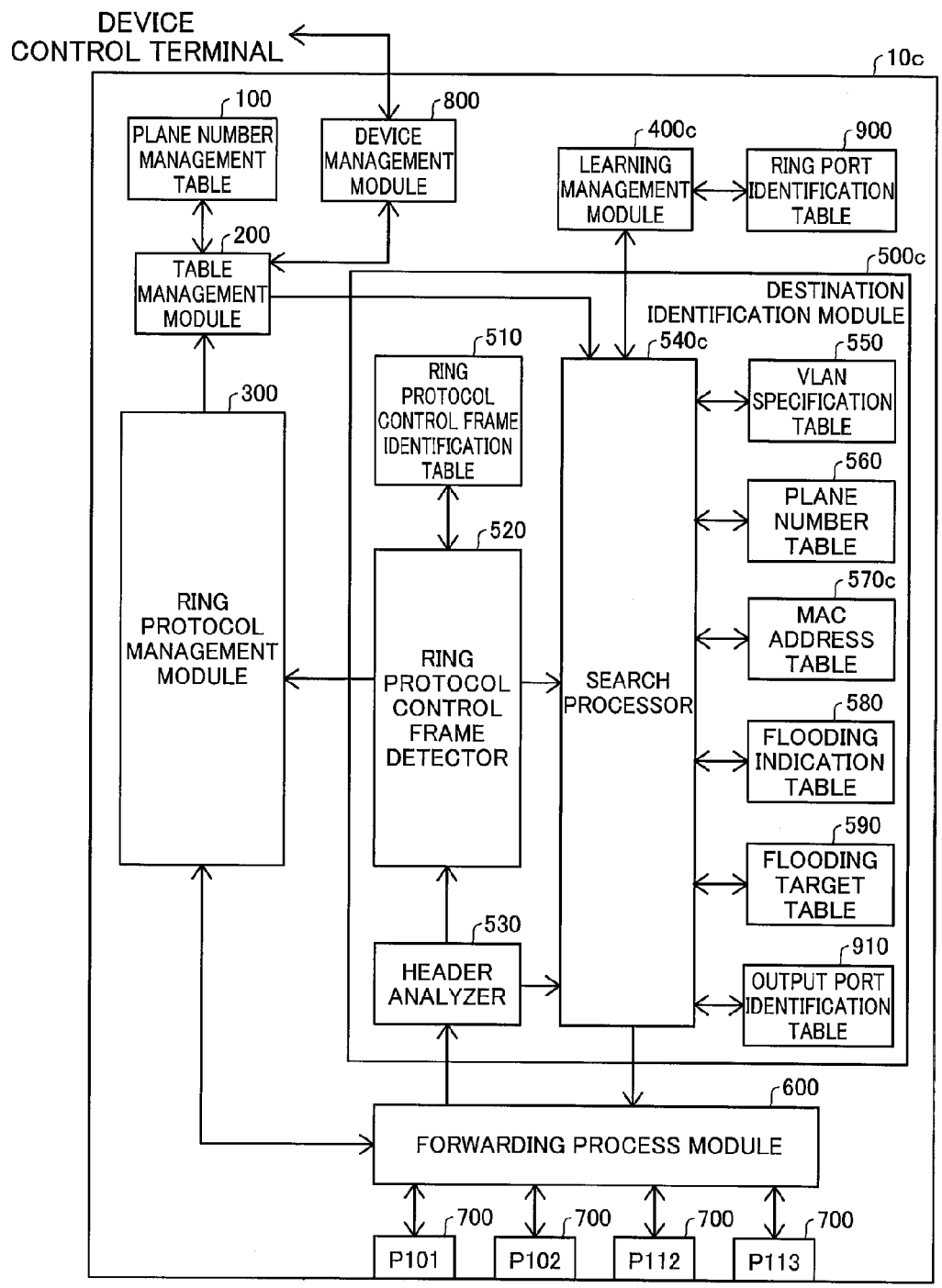
FIG. 32 is an explanatory diagrammatic representation of the general structure of a switch according to a fourth embodiment of the invention.

FIG. 32 is an explanatory diagrammatic representation of the general structure of a switch 10*c* according to a fourth embodiment of the invention. The switch 10*c* of the fourth embodiment basically has the similar structure and operations to those of the switch 10 of the first embodiment described above with reference to FIG. 4, except the operations of a search processor 540*c* and a learning management module 400*c*, addition of an output port identification table 910, and a MAC address table 570*c* used in place of the MAC address table 570.

FIG. 33 is an explanatory diagrammatic representation of one example of the MAC address table 570*c* in the fourth embodiment. The only difference from the MAC address table 570 of the first embodiment shown in FIG. 10 is omission of the port attribute field MTY. Otherwise the structure of the MAC address table 570*c* of the fourth embodiment is similar to that of the MAC address table 570 of the first embodiment.

FIG. 34 is an explanatory diagrammatic representation of one example of the output port identification table 910 in the fourth embodiment. The output port identification table 910 of this embodiment is equivalent to the port attribute storage in the claims of the invention. The output port identification table 910 has a transmit port number field RPO and a port attribute field RPT. The transmit port number field RPO has registries of identification codes or port numbers of all the ports included in the switch 10. The port attribute field RPT has registries of identification codes representing port attributes of the respective ports registered in the transmit port number field RPO. Like the ring port identification table 900 of FIG. 7 described above, the identification code 'RP' is used to represent the ring port attribute, and the identification code 'NRP' is used to represent the non-ring port attribute in the port attribute field RPT.

Figure 35:
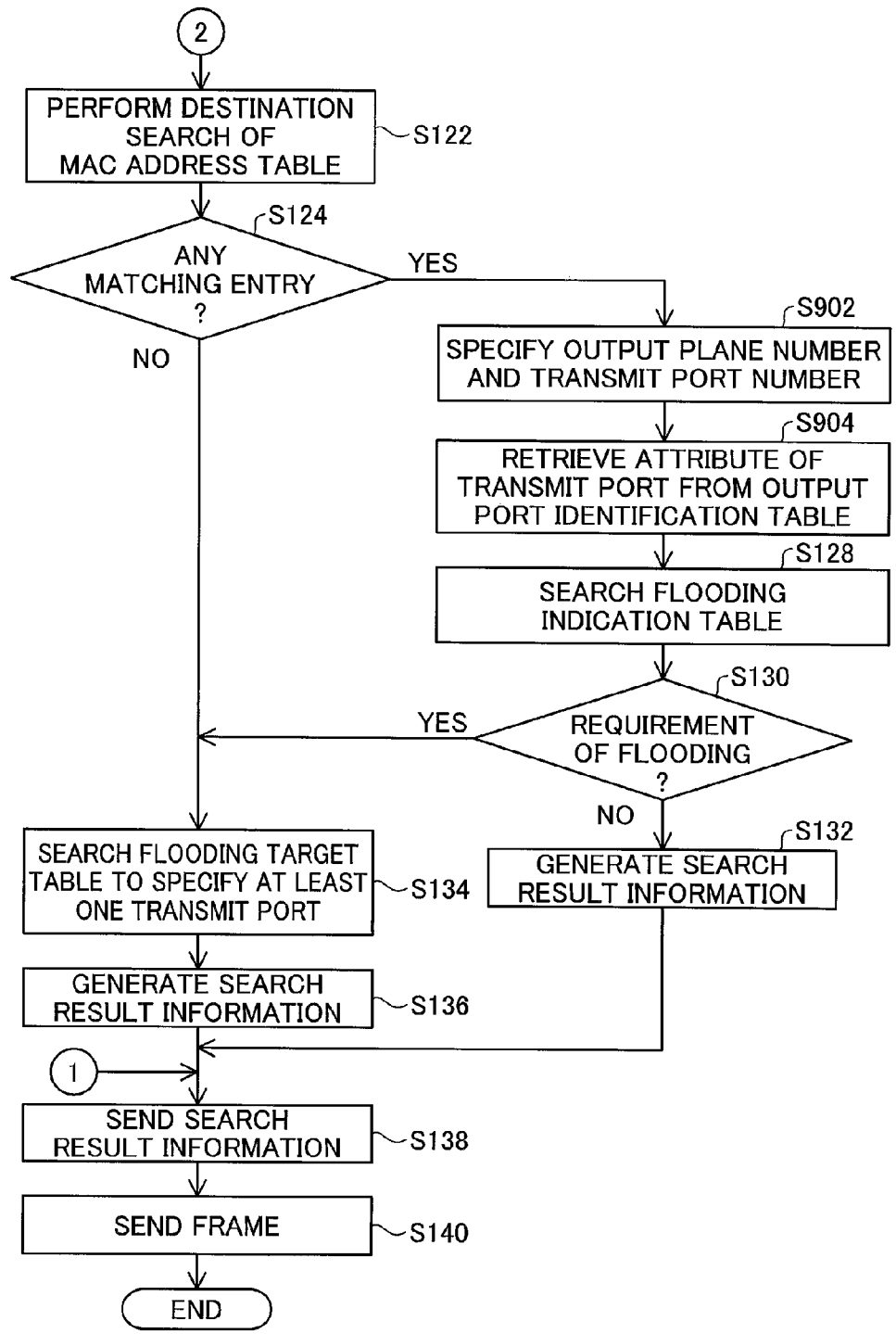
FIG. 35 is a flowchart showing part of a frame forwarding process performed in the fourth embodiment.

FIG. 35 is a flowchart showing part of a frame forwarding process performed in the fourth embodiment. The difference from the frame forwarding process of the first embodiment shown in FIG. 14 is replacement of step S126 with step S902 and addition of step S904. Otherwise the processing flow of the frame forward process of the fourth embodiment is similar to that of the first embodiment. At step S902, the search processor 540*c* specifies the registry in the plane number field MFO and the registry in the port number field MPT of a matching entry respectively as an output plane number and an output port number or transmit port number. At subsequent step S904, the search processor 540*c* retrieves the attribute of the specified transmit port from the output port identification table 910. More specifically, the search processor 540*c* searches the output port identification table 910 for any matching entry with the transmit port number specified at step S902 as a key and specifies the registry in the port attribute field RPT of the matching entry as the port attribute.

Figure 36:
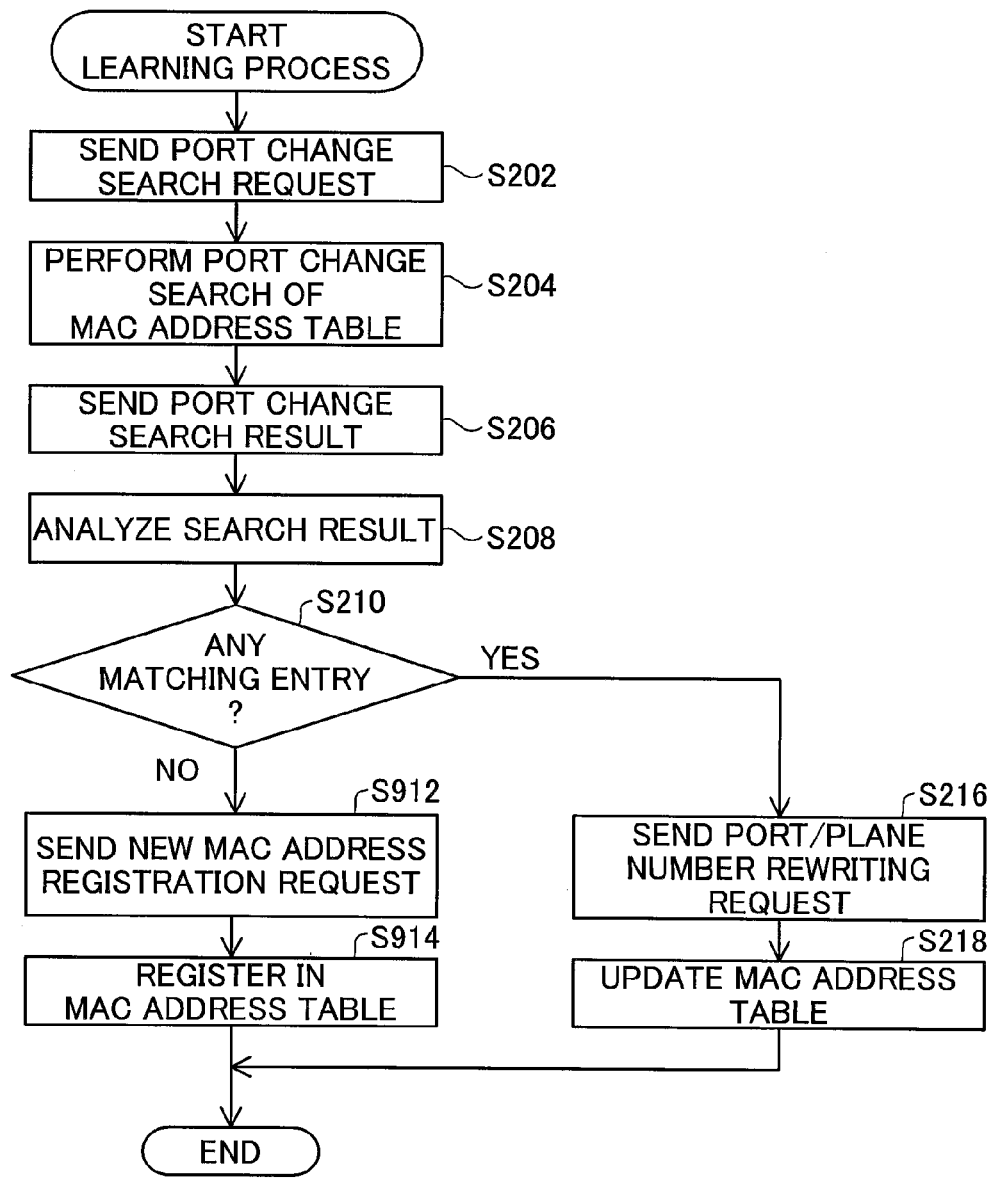
FIG. 36 is a flowchart showing a learning process performed in the fourth embodiment.

FIG. 36 is a flowchart showing a learning process performed in the fourth embodiment. The difference from the learning process of the first embodiment shown in FIG. 15 is omission of step S211 and replacement of steps S212 and S214 with steps S912 and S914. Otherwise the processing flow of the learning process of the fourth embodiment is similar to that of the first embodiment. When there is no matching entry (step S210: No), the learning management module 400*c* sends a new MAC address registration request with the learning search keys as registration information to the search processor 540*c* at step S912. In response to reception of the new MAC address registration request, the search processor 540*c* newly registers the received registration information into the MAC address table 570*c* at step S914.

In the fourth embodiment, the search processor 540*c* functioning as the frame processor specifies the transmit port sending a received frame as a result of the destination search of the MAC address table 570*c* as the MAC address storage and subsequently retrieves the attribute of the specified transmit port from the output port identification table 910 as the port attribute storage. The port attribute is registered in the port attribute storage in the fourth embodiment, while being registered in the MAC address storage in the first embodiment. The arrangement of the fourth embodiment facilitates the structural change of the network relay apparatus.

E. Fifth Embodiment

Figure 37:
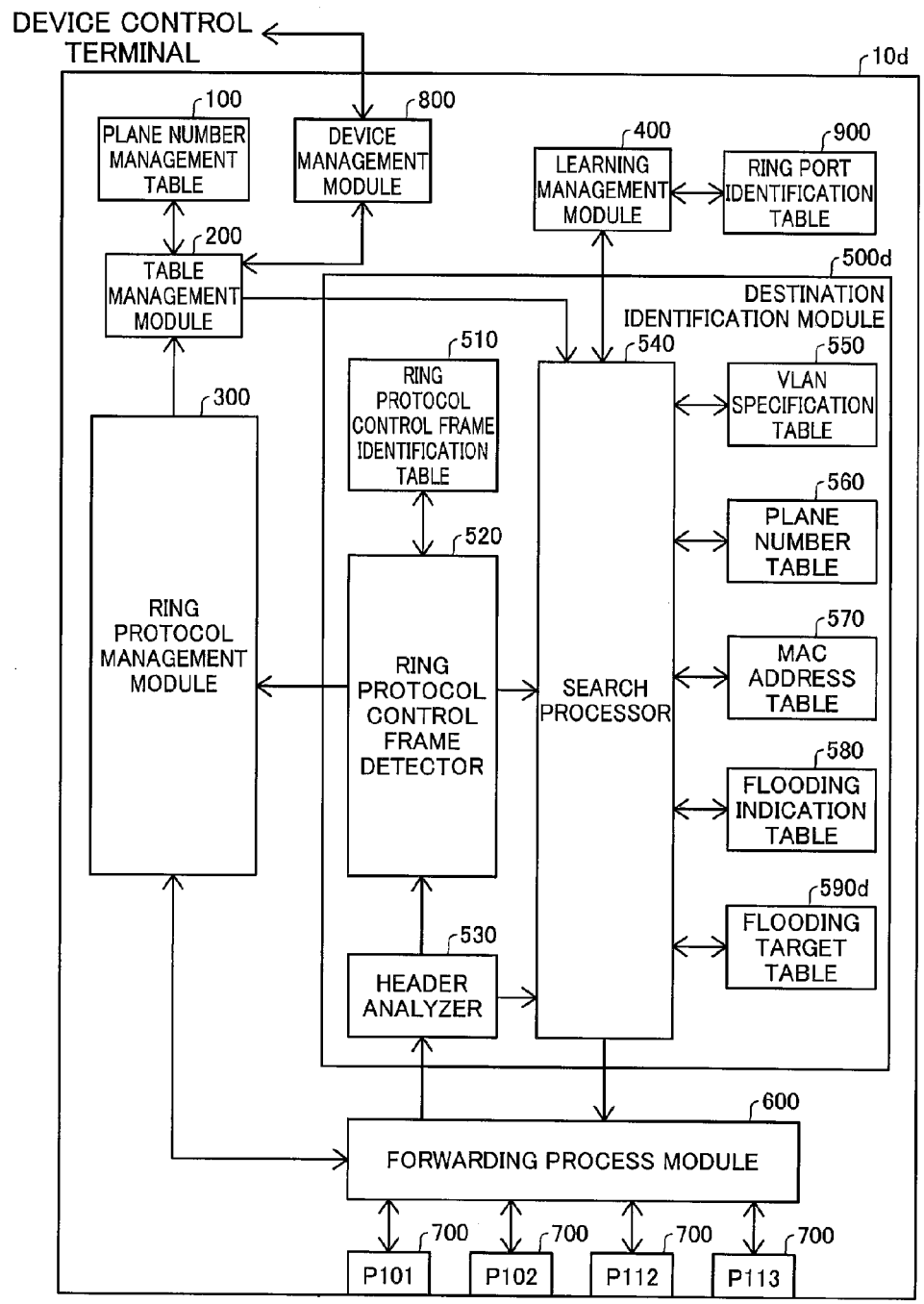
FIG. 37 is an explanatory diagrammatic representation of the general structure of a switch according to a fifth embodiment of the invention.

FIG. 37 is an explanatory diagrammatic representation of the general structure of a switch 10*d* according to a fifth embodiment of the invention. The switch 10*d* of the fifth embodiment basically has the similar structure and operations to those of the switch 10 of the first embodiment described above with reference to FIG. 4, except a flooding target table 590*d* used in place of the flooding target table 590.

Figure 38A:
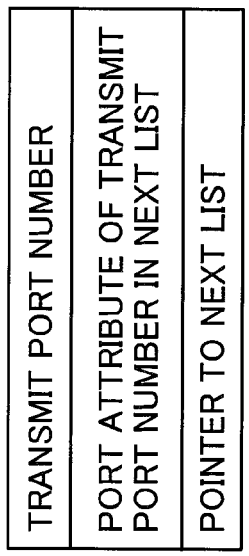
FIGS. 38A and 38B are explanatory diagrammatic representations of one example of the flooding target table in the fifth embodiment.
Figure 38B:
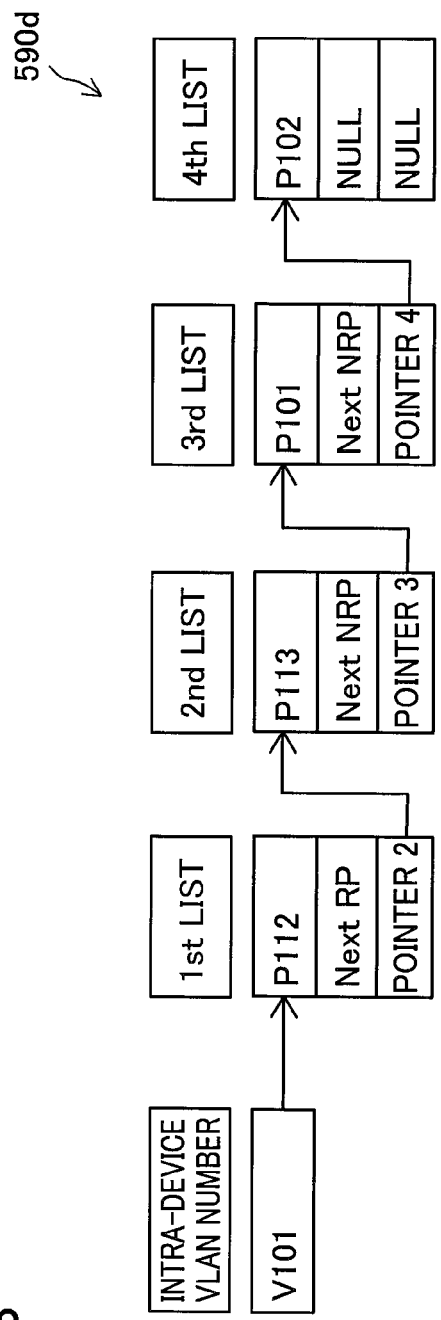

FIGS. 38A and 38B are explanatory diagrammatic representations of one example of the flooding target table 590*d* in the fifth embodiment. The difference from the flooding target table 590 of the first embodiment shown in FIG. 12 is registry of the transmit port numbers in a list structure. FIG. 38A shows an explanatory note of the list structure. In the list structure of FIG. 38A, a top row shows a transmit port number, a medium row shows a port attribute corresponding to a transmit port number in a next list, and a bottom row shows a pointer to the next list.

FIG. 38B shows one example of the flooding target table 590*d*. The illustrated example of FIG. 38B shows lists provided with regard to an intra-device VLAN number of V101. A first list shows that a transmit port having a transmit port number of P112 is a flooding target (top row), that the port attribute of a transmit port in a next list is a ring port (medium row), and that a pointer to the next list is pointer 2 (bottom row). The registry of 'Next RP' represents that the port attribute corresponding to a transmit port number in a next list is a ring port. Similarly the registry of 'Next NRP' represents that the port attribute corresponding to a transmit port number in a next list is a non-ring port. The registries of 'NULL' in a medium row and in a bottom row of a fourth list represent the absence of a next list.

In the list structure, it is preferable to arrange lists of ring ports with the ring port attribute corresponding to the transmit port numbers, prior to those of non-ring ports. In this embodiment, there is no case of performing a flooding operation with setting only non-ring ports as the flooding target. The arrangement of the ring ports first accordingly assures the higher efficiency. From the efficiency viewpoint, it is undesirable to arrange lists of different port attributes alternately, such as a first list for a ring port, a second list for a non-ring port, and a third list for a ring port. Multiple transmit port numbers may be registered in one list for the purpose of speed-up.

In the process of performing a flooding operation with setting only ring ports as the flooding target, when the port attribute corresponding to a transmit port number in a next list (medium row) is 'Next NRP', the search processor 540 stops a further list search. This arrangement enhances the efficiency of the flooding process.

F. Modifications

The invention is not limited to any of the embodiments and their applications discussed above but may be actualized in diversity of other embodiments and applications within the scope of the invention. Some examples of possible modification are given below.

F1. Modification 1

Each of the above embodiments describes the application of the invention to the ring network. The technique of the invention is, however, not restricted to the ring network but is applicable to diversity of other networks, for example, networks according to various protocols, such as STP (Spanning Tree Protocol), MSTP (Multiple Spanning Tree Protocol), PVSTP (Per Virtual LAN Spanning Tree Protocol), and GSRP (Gigabit Switch Redundancy Protocol).

F2. Modification 2

In the above embodiments, each transmit port sending a received frame has either the ring port attribute or the non-ring port attribute. The attribute of the transmit port is, however, not restricted to these embodiments but may be set arbitrarily within the scope of the invention. Each transmit port may have any port attribute defined in a different protocol implemented on another network configuration.

F3. Modification 3

Each of the above embodiments describes the structure of the network relay apparatus. The structure of the network relay apparatus is, however, not restricted to these embodiments but may be changed and modified arbitrarily within the scope of the invention. For example, the network relay apparatus may be structured to have multiple search processors for performing the destination search, with a view to distributing the processing load. The network relay apparatus may be structured to have other adequate processors, in addition to or in place of those shown in FIG. 4.

F4. Modification 4

The respective fields included in the plane number management table, the control frame identification table, the VLAN specification table, the plane number table, the MAC address table, the flooding indication table, the flooding target table, the ring port identification table, and the output port identification table are described in the above embodiments. The fields included in these tables may be determined arbitrarily within the scope of the invention. For example, these tables may be structured to have other adequate fields, in addition to or in place of those described in the embodiments. The respective tables may be formed in the direct map format.

F5. Modification 5

The second, the third, and the fifth embodiments are described as modifications of the first embodiment. The second, the third, and the fifth embodiments may be implemented as modifications of the fourth embodiment. The second, the third, and the fifth embodiments may be applied in any combinations.

The embodiments and their modified examples discussed above are to be considered in all aspects as illustrative and not restrictive. There may be many other modifications, changes, and alterations without departing from the scope or spirit of the main characteristics of the present invention. Part or all of the structures and the functions actualized by the hardware devices, modules or units in the above embodiments may be accomplished by the software configuration. Part or all of the functions implemented by the software modules in the above embodiments may be accomplished by the hardware configuration. All changes within the meaning and range of equivalency of the claims are intended to be embraced therein. The scope and spirit of the present invention are indicated by the appended claims, rather than by the foregoing description.

What is claimed is:

1. A network relay apparatus, comprising:
    multiple ports, each being provided to send and receive a frame to and from one of multiple external devices;
    a frame processor configured to set a flooding target corresponding to an attribute of a port that sends the received frame, and to perform flooding on the basis of the flooding target, in order to relay a received frame that is received via one of the multiple ports as a receiving port;
    a port attribute storage configured to store a port attribute in correlation with each of the multiple ports;
    a flooding target storage configured to store a flooding target set in advance with regard to each port attribute;
    a media access control (MAC) address storage configured to store a MAC address of each of the multiple external devices in correlation with one of the multiple ports;
    a learning manager configured to retrieve an attribute of the receiving port from the port attribute storage and register the retrieved attribute in correlation with a corresponding port in the MAC address storage, so as to implement a learning process with regard to the MAC address storage;
    a flooding indication storage configured to store requirement or non-requirement of flooding in correlation with each of the multiple ports,
    wherein:
    the frame processor refers to information registered in the port attribute storage and in the flooding target storage when the flooding target is set,
    the frame processor performs a destination search of the MAC address storage to specify a transmit port and a attribute of the transmit port, and
    the frame processor retrieves requirement or non-requirement of flooding from the flooding indication storage based on the specified transmit port, and on retrieval of the requirement of flooding, and sets a flooding destination from retrieval of the flooding target storage based on the specified attribute of the transmit port and performs flooding.

2. The network relay apparatus in accordance with claim 1, further comprising:
    the MAC address storage configured to store the MAC address of each of the multiple external devices in correlation with one of the multiple ports;

the flooding indication storage configured to store requirement or non-requirement of flooding in correlation with each of the multiple ports, wherein the frame processor performs a destination search of the MAC address storage to specify the transmit port, and searches the port attribute storage with the specified transmit port as a key to specify the attribute of the transmit port, and the frame processor retrieves requirement or non-requirement of flooding from the flooding indication storage based on the specified transmit port, and on retrieval of the requirement of flooding, and sets the flooding destination from retrieval of the flooding target storage based on the specified attribute of the transmit port and performs flooding.

3. The network relay apparatus in accordance with claim 1, further comprising:

a table manager configured to update information registered in the MAC address storage, wherein when an attribute of each of the multiple ports registered in the MAC address storage coincides with a specified attribute, the table manager does not delete information of correlating a MAC address of one of the multiple external devices to one of the multiple ports from the MAC address storage, even on reception of a deletion request from the MAC address storage.

4. The network relay apparatus in accordance with claim 1, further including:

a device manager configured to receive a deletion request from one of the multiple external devices connecting with the network relay apparatus and delete corresponding information of correlating a MAC address of one of the multiple external devices to one of the multiple ports from the MAC address storage.

5. The network relay apparatus in accordance with claim 1, wherein the learning manager allocates an identification code of a different virtual network to each attribute of the receiving port and registers the allocated identification code of each virtual network in correlation with a corresponding port in the MAC address storage.

* * * * *